United States Patent
Khanna et al.

(10) Patent No.: US 12,130,688 B2
(45) Date of Patent: Oct. 29, 2024

(54) METHODS AND APPARATUS TO OPTIMIZE A GUARD BAND OF A HARDWARE RESOURCE

(71) Applicant: Intel Corporation, Santa Clara, CA (US)

(72) Inventors: Rahul Khanna, Portland, OR (US); Xin Kang, La Jolla, CA (US); Ali Taha, San Diego, CA (US); James Tschanz, Portland, OR (US); William Zand, Garden Grove, CA (US); Robert Kwasnick, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 726 days.

(21) Appl. No.: 17/133,226

(22) Filed: Dec. 23, 2020

(65) Prior Publication Data
US 2021/0116982 A1 Apr. 22, 2021

(51) Int. Cl.
| G06F 1/324 | (2019.01) |
| G06F 1/3287 | (2019.01) |
| G06F 1/3296 | (2019.01) |
| G06F 9/50 | (2006.01) |

(52) U.S. Cl.
CPC ............ *G06F 1/324* (2013.01); *G06F 1/3287* (2013.01); *G06F 1/3296* (2013.01); *G06F 9/5094* (2013.01)

(58) Field of Classification Search
CPC .................................... G06F 1/32; G06F 1/26
See application file for complete search history.

(56) References Cited

U.S. PATENT DOCUMENTS

| 7,042,259 | B2 | 5/2006 | Kurd et al. | |
| 7,475,262 | B2* | 1/2009 | Banginwar | G06F 1/3203 700/32 |
| 8,370,836 | B2* | 2/2013 | Shetty | G06F 9/45558 718/1 |
| 10,169,104 | B2* | 1/2019 | Folco | G06F 9/5094 |
| 2006/0184937 | A1* | 8/2006 | Abels | G06F 9/455 718/1 |
| 2008/0172398 | A1* | 7/2008 | Borkenhagen | G06F 9/5044 |
| 2009/0187776 | A1* | 7/2009 | Baba | G06F 1/324 713/320 |
| 2011/0072293 | A1* | 3/2011 | Mazzaferri | G06F 1/3203 713/340 |

(Continued)

OTHER PUBLICATIONS

Extended European Search Report issued for European Application No. 21197058.7 dated Feb. 22, 2022, 10 pages.

(Continued)

*Primary Examiner* — Phil K Nguyen
(74) *Attorney, Agent, or Firm* — Hanley, Flight & Zimmerman, LLC

(57) ABSTRACT

Methods, apparatus, systems and articles of manufacture are disclosed to optimize a guard band of a hardware resource. An example apparatus includes at least one storage device, and at least one processor to execute instructions to identify a phase of a workload based on an output from a machine-learning model, the phase based on a utilization of one or more hardware resources, and based on the phase, control a guard band of a first hardware resource of the one or more hardware resources.

22 Claims, 12 Drawing Sheets

(56) References Cited

U.S. PATENT DOCUMENTS

| | | | |
|---|---|---|---|
| 2011/0258621 A1* | 10/2011 | Kern | G06F 9/45558 718/1 |
| 2018/0026913 A1 | 1/2018 | Balle et al. | |
| 2019/0108087 A1 | 4/2019 | Biran et al. | |
| 2019/0146569 A1 | 5/2019 | Nge et al. | |
| 2020/0223423 A1* | 7/2020 | Haskara | B60W 10/06 |
| 2020/0272220 A1 | 8/2020 | Mosalikanti et al. | |

OTHER PUBLICATIONS

Charles R. Lefurgy et al., "Active Management of Timing Guardband to Save Energy in POWER7," Micro 11, Dec. 3-7, 2011, Porto Alegre, Brazil (11 pages).

James Tschanz et al., "Tunable Replica Circuits and Adaptive Voltage-Frequency Techniques for Dynamic Voltage, Temperature, and Aging Variation Tolerance," 2009 Symposium on VLSI Circuits Digest of Technical Papers, downloaded on Nov. 5, 2020 (2 pages).

Diana Guttman et al., "Machine Learning Techniques for Improved Data Prefetching," 5th International Conference on Energy Aware Computing Systems & Applications, Cairo, 2015, pp. 1-4, doi: 10.1109/ICEAC.2015.7352208Downloaded on Nov. 5, 2020 (4 pages).

Keith A. Bowman et al., "A 45 nm Resilient Microprocessor Core for Dynamic Variation Tolerance," IEEE Journal of Solid-State Circuits, vol. 46, No. 1, Jan. 2011 (15 pages).

Nasser Kurd et al., "Next Generation Intel® Micro-architecture (Nehalem) Clocking Architecture," 2008 IEEE Symposium on VLSI Circuits, Honolulu, HI, 2008, pp. 62-63, doi: 10.1109/VLSIC.2008.4585952, Downloaded on Nov. 5, 2020 (2 pages).

Ahmad El Youssef et al., "Autonomic Tool for Optimal Cache-Sharing Using Evolutionary Techniques," 2013 4th Annual International Conference on Energy Aware Computing Systems and Applications (ICEAC), Downloaded on Nov. 5, 2020 (6 pages).

Rahul Khanna et al., "Autonomic Characterization of Workloads using Workload Fingerprinting," 2014 IEEE International Conference on Cloud Computing in Emerging Markets (CCEM), Bangalore, 2014, pp. 1-8, doi: 10.1109/CCEM.2014.7015482., downloaded on Nov. 5, 2020 (8 pages).

* cited by examiner

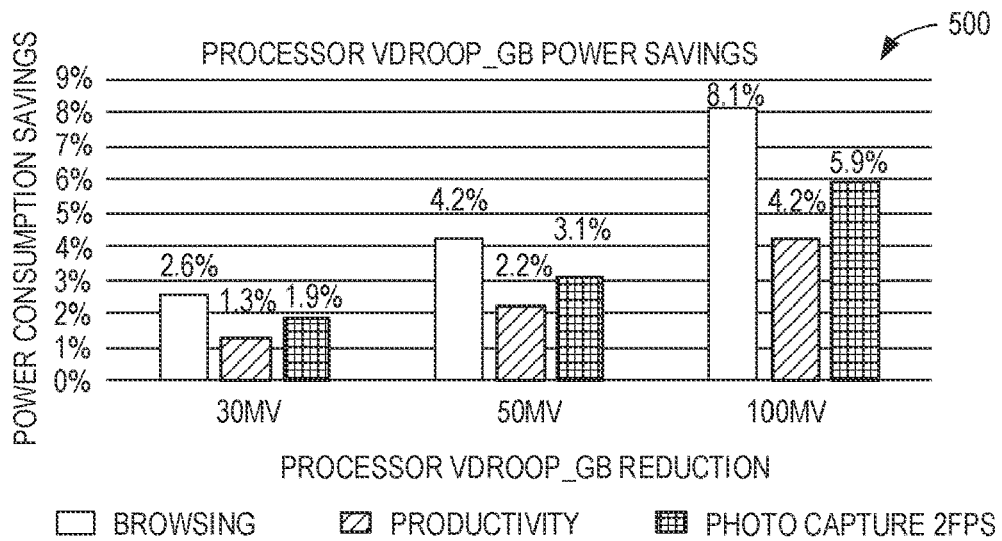
FIG. 5
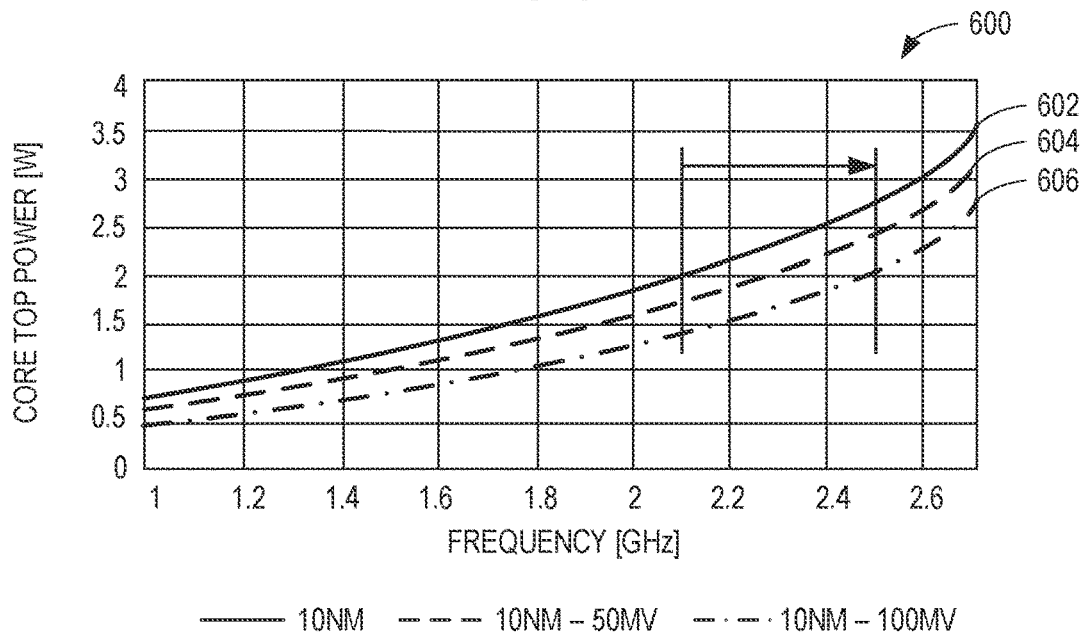
FIG. 6
| GB REDUCTION [MV] | YIELD AT 5W TDP (2.8 GHz) |
|---|---|
| 0 | 52% |
| 15 | 67% |
| 25 | 75% |
| 40 | 85% |
| 50 | 90% |
| 100 | 98% |
FIG. 7

METHODS AND APPARATUS TO OPTIMIZE A GUARD BAND OF A HARDWARE RESOURCE

FIELD OF THE DISCLOSURE

This disclosure relates generally to computing devices and, more particularly, to methods and apparatus to optimize a guard band of a hardware resource.

BACKGROUND

Computing devices may consume relatively large amounts of energy when executing computationally intensive tasks. Power management tools may be deployed to such computing devices to manage energy expenditure. Such power management tools may manage the energy expenditure by setting excessively conservative operating setpoints of the computing devices, which leads to increased energy expenditure at the expense of system performance.

BRIEF DESCRIPTION OF THE DRAWINGS

FIG. 5 depicts a graph of example power savings of the example computing system of FIG. 1 that may be achieved by the example guard band controller of FIGS. 1, 2, and/or 3.

FIG. 6 depicts a graph of example improved performance of the example computing system of FIG. 1 that may be achieved by the example guard band controller of FIGS. 1, 2, and/or 3.

FIG. 7 depicts a table of example improvements in a binning process of example hardware resources that may be achieved in response to example guard band reductions effectuated by the example guard band controller of FIGS. 1, 2, and/or 3.

DETAILED DESCRIPTION

Figure 1:
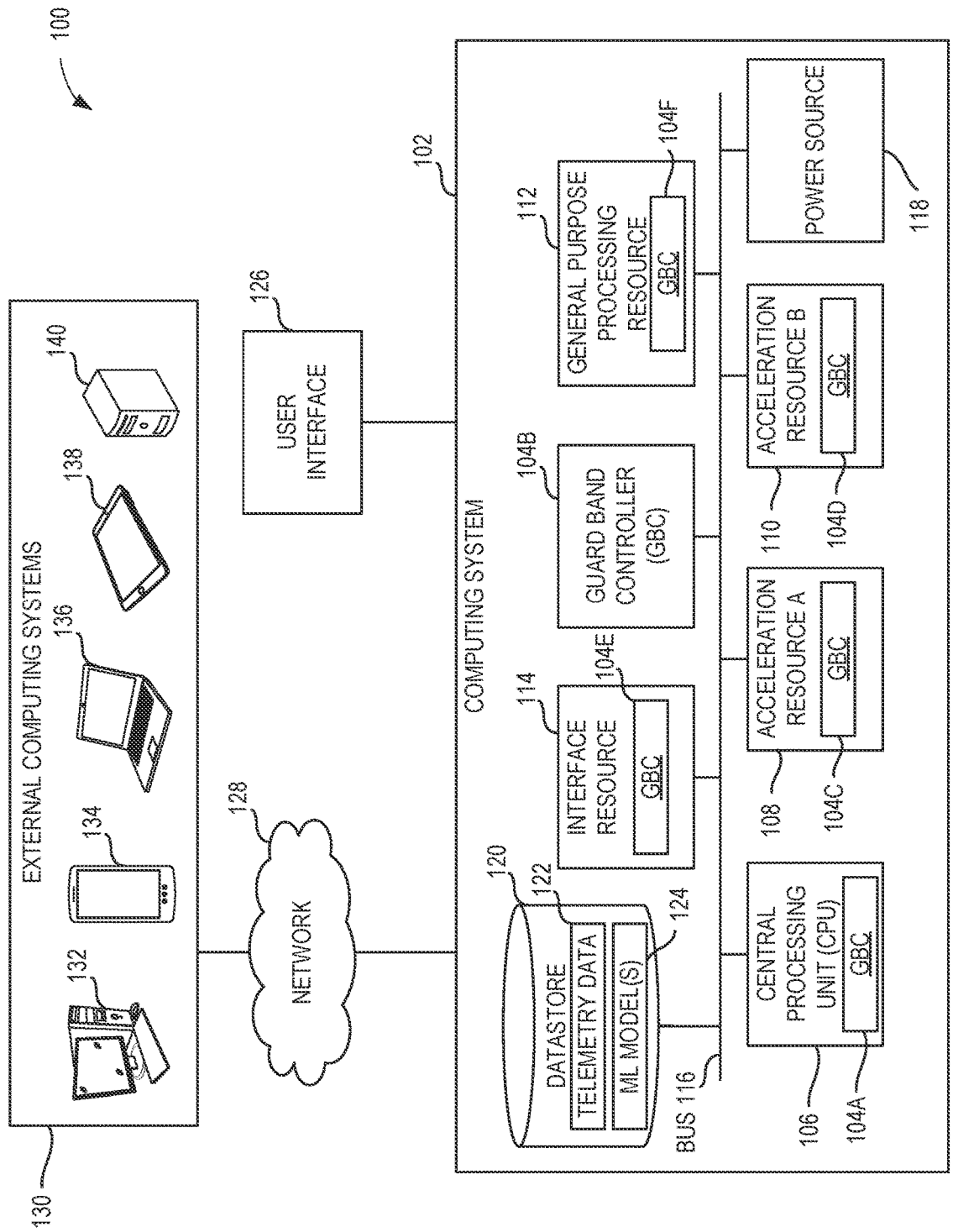
FIG. 1 is an illustration of an example computing system including an example guard band controller to facilitate power management of the computing system.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

Computing devices, systems, etc., can consume relatively large amounts of energy when executing computationally intensive tasks. Power management tools may be deployed on computing devices that are energy limited, such as computing devices that are battery powered. Such power management tools may manage energy expenditure and/or otherwise extend battery life of the energy-limited computing devices.

In some instances, power management tools may be deployed on computing devices that are not energy limited, such as computing servers or other hardware that are powered by a power grid infrastructure or power delivery network. Such power management tools may manage energy expenditure of the computing devices to avoid failure associated with time-varying droops in power delivery networks when driving load(s) or device(s) that are executing workloads (e.g., computing workloads). For example, different computing workloads executed by load(s) or device(s)

may require different levels of electrical current from the power delivery networks for execution.

As used herein, the terms "droop" or "voltage droop" refer to a loss in an output voltage of a device (e.g., a main printed circuit board of a computing device (e.g., a motherboard), a power supply, a voltage regulator, etc.) as the device drives a load (e.g., an interface device, a logic circuit, a memory device, a processor, a storage device, etc.). For example, a voltage regulator may have a droop in output voltage in response to a change in a workload executed by the load that is driven by the voltage regulator. In some examples, a change or transition from a first workload to a second workload may demand a relatively large increase in electrical current to facilitate execution of the second workload. For example, the voltage regulator may have the droop in the output voltage in response to the relatively large increase in the electrical current. The voltage droop may be a dynamic voltage droop and/or associated with load-line loss. A dynamic voltage droop may occur when there are relatively fast changes (e.g., occurring at time scales from $10^{-6}$ to $10^{-10}$ seconds) in electrical current demand by the load or may occur due to temperature dependencies of the processor when performing workload(s).

Dynamic voltage droops may vary substantially by workload. For example, workload(s) with a relatively large amount of data-parallel instructions (e.g., Advanced Vector Extension (AVX) instructions developed by Intel®) may incur much larger voltage droops than workloads with less concentrated power demands. For example, a first workload, such as executing data-parallel instructions, may require a first quantity of electrical current that is greater than a second quantity of electrical current for a second workload, such as executing a word processor computing application. The dynamic voltage droops may be time-varying because they may increase or decrease over time with respect to workload(s) being executed by the processor. A mismanagement of voltage droop may cause persistent crashes of the processor and/or associated circuitry (e.g., a chipset, memory, etc.), and/or, more generally, the computing device. Such persistent crashes may cause data loss, hardware component failure, and/or otherwise degrade a user (e.g., an Infrastructure Technology (IT) administrator, a customer, a developer, etc.) experience in connection with operating the computing device.

Some computing devices run at operating setpoints or settings based on guard bands to avoid failure associated with the time-varying droops to achieve high-reliability integrated circuits (e.g., CPUs and/or associated chipsets). For example, the operating setpoints, operating settings, etc., may include electrical current operating setpoints or settings, voltage operating setpoints or settings, frequency operating setpoints or settings, timing operating setpoints or settings, etc., and/or a combination thereof. As used herein, "a guard band" or "voltage guard band" is a fixed or static voltage that is added to a lowest voltage at which a load may operate correctly while executing a workload to account for impact(s) from different operating conditions (e.g., loss in a power delivery network (IR drop), loss in response to dynamic droops(s), operating temperature, etc.). For example, a guard band as disclosed herein may be implemented in a device to guard against adverse device operating conditions, which may lead to unreliable and/or destructive operation of the device. In some examples, a load may have different guard bands for different operating setpoints or settings. For example, the load may have a first guard band for a first operating frequency of the load, a second guard band for a second operating frequency of the load, etc. In some examples, the guard band may implement a safety margin (e.g., a safety voltage margin) or range in which the load may operate correctly. For example, the guard band may indicate a maximum voltage drop that is high enough to account for a worst-case droop in the output by the voltage regulator. Alternatively, any other type of guard bands may be utilized including current guard bands (e.g., electrical current guard bands), frequency guard bands (e.g., operating frequency guard bands), timing guard bands, etc., to implement the examples disclosed herein.

By way of example, a load, such as a processor of a computing device, may operate correctly with an operating voltage as low as 3.1 Volts Direct Current (V DC) from a voltage regulator. In some examples, a guard band of 0.2 V DC may be added by the voltage regulator to the lowest operating voltage of 3.1 V DC to implement a safety margin of 3.1 V DC to at least 3.3 V DC. For example, the voltage regulator may add 0.2 V DC to the output voltage supplied to the processor at all times while the voltage regulator drives the processor. In such examples, the voltage regulator may provide 3.3 V DC to the processor even though the processor may operate with an operating voltage as low as 3.1 V DC. In some examples, in response to a droop in the output voltage of the voltage regulator caused by an increased demand of electrical current by the processor, the voltage regulator may output 3.1 V DC and, thus, the implemented guard band of 0.2 V DC may cause the processor to continue operating without failure. For example, without the guard band of 0.2 V DC, the voltage regulator may output 2.9 V DC to the processor, which may cause the processor to fail and/or otherwise cease operating correctly.

In some examples, the guard band may be relatively conservative, which may lead to excessive power consumption or power waste. For example, the guard band may be satisfied by applying a voltage on a die of a processor that is large enough to account for any dynamic voltage droops and/or any loss in a power delivery network that is coupled to the processor. Since voltage droops are difficult to predict, a fixed, worst-case voltage is applied to the processor to guarantee correct or expected processor operation even in the presence of a worst case IR drop (e.g., an electrical potential difference between the input(s) and the output(s) of the power delivery network) and/or a worst-case voltage droop. A guard band may indicate such a fixed, worst-case voltage and may be a significant source of power consumption (or performance loss at the same power).

The processor may operate at a voltage operating setpoint that incorporates the conservative guard band to prevent voltage droops from causing the processor to crash and/or otherwise not operate as intended. Voltage operating setpoints that incorporate these conservative guard bands may be unnecessarily high for a processor effectuating light or regular workloads. For example, a guard band may specify a value (e.g., 0.1 V DC, 0.25 V DC, etc.) and a voltage operating setpoint of the processor may be set such that the voltage operating setpoint includes the guard band. By way of example, a guard band for a processor may be 0.2 V DC and a voltage regulator may increase a voltage operating setpoint from 3.1 V DC to 3.3 V DC to account for the guard band. In some examples, the guard band may be relatively conservative, such as having a value of 0.5 V DC, which may cause the voltage regulator to output a relatively high operating voltage of 3.6 V DC compared to a not-as-conservative guard band of 0.2 V DC. The difference in voltage operating setpoints (e.g., a 3.6 V DC voltage operating setpoint based on 0.5 V DC guard band and a 3.3 V DC voltage operating setpoint based on a 0.2 V DC guard band) may correspond to excessive power consumption to implement the guard band instead of implementing additional workloads. In some examples, a processor that is executing a light or regular workload at a voltage operating setpoint based on a relatively conservative guard band may consume a relatively high amount of power. In such examples, a portion of the high amount of power is consumed by the implementation of the guard band, which is not needed for the execution of the workload.

Some computing devices address voltage droops caused by power-hungry instructions, such as AVX instructions, by dynamically lowering a guaranteed operating frequency of a processor when the power-hungry instructions are executed. For example, a processor may cause a relatively large voltage droop to occur when executing an AVX instruction. In such examples, the lowering of the processor frequency may allow the processor to execute the AVX instruction correctly even under the large voltage droop while not penalizing non-AVX instruction execution by the processor. However, such dynamic frequency lowering is a very coarse-grain approach that may only work for AVX-type instructions over a relatively long time scale (e.g., milliseconds, seconds, etc.) compared to the time scales at which voltage droops occur (e.g., $10^{-6}$ to $10^{-10}$ seconds).

Some computing devices that utilize a guard band to address voltage droops, manage the power consumption due to the guard band by reducing the guard band through adaptive frequency scaling (AFS). For example, a frequency (e.g., a clock frequency provided by a phase-lock loop (PLL) circuit of a processor core) of a processor may be modulated based on a voltage, so that the frequency is reduced during a voltage droop event. Such frequency modulation may enable the processor to operate correctly in the presence of infrequent voltage droops, but is not able to dynamically respond to differences in workload, which may also cause some voltage droop guard band to remain. For example, AFS may cause unnecessary power consumption by the processor because the voltage droop guard band is decreased in response to the frequency lowering but is not substantially decreased and/or otherwise not eliminated.

Some computing devices that utilize a guard band to address voltage droops, manage the power consumption due to guard band by reducing the guard band using critical path monitor circuits. Such critical path monitor circuits may measure available timing margin of a processor, adjust clock frequency in response to excess or inadequate timing margin, and reduce excess guard band to achieve the adjusted clock frequency. However, such critical path monitor circuits rely on very fast voltage droop sensing and response that may be difficult to achieve in a large processor core. In some such computing devices, the constantly changing clock frequency may cause operating issues with an associated fabric (e.g., connectivity between the processor and one or more peripheral devices) and/or processor interface(s).

Examples disclosed herein optimize and/or otherwise improve a guard band of a hardware resource. In some disclosed examples, a guard band controller reduces and/or otherwise adjusts safety margins for an operating setpoint of the hardware resource based on a phase of a workload being executed by the hardware resource while maintaining a high-reliability rate of the hardware resource. As used herein, the terms "phase" or "workload phase" may refer to a stage of execution of a workload in which the workload demonstrates consistent or repeatable characteristics (e.g., consistent or repeatable characteristics within a range) such as power, temperature, resource utilization, and/or performance characteristics. Advantageously, examples disclosed herein may effectuate increased computing density, such as server rack density, based on realized power reductions. For example, the hardware resource may be operated at a higher frequency in response to lowering the guard band. In such examples, one or more processors of a server of a server rack may operate with increased performance and reduced guard band at the same power level as that of the one or more processors operating with reduced performance and increased guard band.

In some disclosed examples, the guard band controller dynamically adapts a guard band of a hardware resource based on a workload, a phase of the workload, etc., such that the guard band is optimized and/or otherwise minimized while maintaining expected or typical operation of the hardware resource. For example, different workloads and/or different phases within a workload may exhibit very different voltage droop and/or IR drop behavior. In such examples, a fixed guard band may cause wasteful power consumption in many workload cases.

In some disclosed examples, the guard band controller monitors a voltage droop behavior of a workload and learns in real time to identify and model workload phases of the workload to predict and/or otherwise determine an optimal guard band. In some disclosed examples, the guard band controller utilizes one or more artificial intelligence (AI) models as described below to learn voltage droop behaviors for different workload phases and/or workloads, identify the different workload phases and/or workloads, and/or predict optimal guard bands for such different workload phases and/or workloads. For example, the guard band controller can dynamically auto-tune safety voltage margins according to a forecasted stress on the hardware resource(s) with configurable performance loss, as the workload transitions from one workload phase to another. Advantageously, in some disclosed examples, the guard band controller can determine when to dynamically increase or decrease the safety voltage margins to maintain a probability of critical voltage droops within configurable limits in the presence of a fast-reactive voltage droop mitigation loop as described below.

In some disclosed examples, a core of a processor or other processor circuitry includes the fast-reactive voltage droop mitigation loop to guarantee and/or otherwise enforce correct operation of the core in response to voltage droop mismanagement by the guard band controller. Advantageously, in some disclosed examples, a combination of the AI-driven guard band prediction and the fast-reactive voltage droop mitigation loop as described herein may lead to the reduction of voltage droop guard band across many types of workloads, provide power savings, and/or allow improved performance of a hardware resource, such as a processor, a core of the processor, etc.

As described above, in some disclosed examples, the guard band controller determines to adjust a guard band of one or more hardware resources of a computing system in response to executing one or more AI models. AI, including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the example guard band controller may train the model with data (e.g., utilization data, workload phase data, workload data, etc.) to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. Using a neural network model enables the example guard band controller to classify a workload and/or a phase of the workload executed by one or more hardware resources, determine a probability representative of whether the one or more hardware resources are likely to operate correctly at the instant guard band, and/or determine adjustment(s) to the guard band based on at least one of the classification or the probability. In general, machine learning models/architectures that are suitable to use in the example approaches disclosed herein include recurrent neural networks. However, other types of machine learning models could additionally or alternatively be used such as supervised learning artificial neural network models, clustering models, classification models, etc., and/or a combination thereof. Example supervised learning artificial neural network models can include two-layer (2-layer) radial basis neural networks (RBN), learning vector quantization (LVQ) classification neural networks, etc. Example clustering models can include k-means clustering, hierarchical clustering, mean shift clustering, density-based clustering, etc. Example classification models can include logistic regression, support-vector machine or network, Naive Bayes, etc.

In general, implementing an ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be model hyperparameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models can be trained using unsupervised clustering of operating observables. For example, the operating observables may include utilization, cache performance, voltage droop patterns or delay prediction, residency or time spent in each phase, probability of transitioning to a next phase, etc. In some examples, ML/AI models disclosed herein can be trained to allow certain phases to operate at lower margins than other phases (thereby saving energy by making available only the sufficient margin at any time during execution). For example, this may allow the voltage droop margins to be predictably more conservative in some phases than others.

In some examples, modeling false-positives are fed into the cluster-based ML/AI models using continuous on-line model training to improve the accuracy of the ML/AI models with respect to time.

In examples disclosed herein, ML/AI models can be trained using stochastic gradient descent. However, any other training algorithm may additionally or alternatively be used such as Simulated Annealing, Particle Swarm Optimization, Evolution Algorithms, Genetic Algorithms, Nonlinear Conjugate Gradient, etc. In examples disclosed herein, training can be performed until the level of error is no longer reducing. In examples disclosed herein, training can be performed locally on the computing system and/or remotely at an external computing system (e.g., a central facility, one or more servers, etc.) communicatively coupled to the computing system. Training is performed using hyperparameters that control how the learning is performed (e.g., a learning rate, a number of layers to be used in the machine learning model, etc.). In examples disclosed herein, hyperparameters that control model performance and training speed are the learning rate and regularization parameter(s). Such hyperparameters are selected by, for example, trial and error to reach an optimal model performance. In some examples, Bayesian hyperparameter optimization is utilized to determine an optimal and/or otherwise improved or more efficient network architecture to avoid model overfitting and improve model's overall applicability. Alternatively, any other type of optimization may be used. In some examples re-training may be performed. Such re-training may be performed in response to override(s) by a user of model-determined guard band adjustment(s).

Training is performed using training data. In examples disclosed herein, the training data originates from locally generated data, such as telemetry data from the computing system. For example, the telemetry data can include utilization data associated with one or more hardware resources of the computing system. In some disclosed examples where supervised training is used, the training data is labeled. Labeling is applied to the training data by a user manually or by an automated data pre-processing system. In some examples, the training data is pre-processed using, for example, an interface (e.g., a telemetry interface) to determine one or more telemetry parameters based on the telemetry data. In some examples, the training data is sub-divided into a first portion of data for training the model, and a second portion of data for validating the model.

Once training is complete, the model is deployed for use as an executable construct that processes an input and provides an output based on the network of nodes and connections defined in the model. The model is stored in memory of the computing system or in a database, datastore, etc., of a remote computing system. The model may then be executed by the example guard band controller.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is an illustration of an example computing environment 100 including an example computing system 102 including an example guard band controller 104A-F to facilitate guard band management and/or, more generally, power management of the computing system 102. For example, the guard band controller 104A-F may adjust a guard band of one or more hardware resources of the computing system 102 based on a workload or phase thereof executed by the computing system 102.

The computing system 102 of the illustrated example of FIG. 1 includes an example central processing unit (CPU) 106, a first example acceleration resource (ACCELERATION RESOURCE A) 108, a second example acceleration resource (ACCELERATION RESOURCE B) 110, an example general purpose processing resource 112, an example interface resource 114, an example bus 116, an example power source 118, and an example datastore 120. In this example, the datastore 120 includes example telemetry data 122 and example machine learning (ML) model(s) 124. Further depicted in the illustrated example of FIG. 1 is an example user interface 126, an example network 128, and example external computing systems 130.

In some examples, the computing system 102 is a system-on-a-chip (SoC) representative of one or more integrated circuits (ICs) (e.g., compact ICs) that incorporate components of a computer or other electronic system in a compact format. For example, the computing system 102 may be implemented with a combination of one or more programmable processors, hardware logic, and/or hardware peripherals and/or interfaces. Additionally or alternatively, the example computing system 102 of FIG. 1 may include memory, input/output (I/O) port(s), and/or secondary storage. For example, the computing system 102 includes the guard band controller 104A-F, the CPU 106, the first acceleration resource 108, the second acceleration resource 110, the general purpose processing resource 112, the interface resource 114, the bus 116, the power source 118, the datastore 120, the memory, the I/O port(s), and/or the secondary storage all on the same substrate. In some examples, the computing system 102 includes digital, analog, mixed-signal, radio frequency (RF), or other signal processing functions.

In the illustrated example of FIG. 1, the first acceleration resource 108 is a graphics processing unit (GPU). For example, the first acceleration resource 108 can be a GPU that generates computer graphics, executes general-purpose computing, etc. The second acceleration resource 110 of the example of FIG. 1 is an AI accelerator. For example, the second acceleration resource 110 can be a vision processing unit to effectuate machine or computer vision computing tasks, train and/or execute a physical neural network, and/or train and/or execute a neural network. In some examples, the vision processing unit may train and/or execute a convolution neural network (CNN), a deep neural network (DNN), an artificial neural network (ANN), a recurrent neural network (RNN), etc., and/or a combination thereof. The general purpose processing resource 112 of the example of FIG. 1 is a programmable processor, such as a CPU or a GPU. Alternatively, one or more of the first acceleration resource 108, the second acceleration resource 110, and/or the general purpose processing resource 112 may be a different type of hardware such as a digital signal processor (DSP), an application specific integrated circuit (ASIC), a programmable logic device (PLD), and/or a field programmable logic device (FPLD) (e.g., a field-programmable gate array (FPGA)).

In the illustrated example of FIG. 1, the interface resource 114 is hardware that implements and/or is representative of one or more interfaces (e.g., computing interfaces, network interfaces, etc.). For example, the interface resource 114 may be hardware, software, and/or firmware that implements a communication device (e.g., a network interface card (NIC), a smart NIC, etc.) such as a transmitter, a receiver, a transceiver, a modem, a residential gateway, a wireless access point, and/or a network interface to facilitate exchange of data with external machines (e.g., computing devices of any kind) via the network 128. In some examples, the communication is effectuated via a Bluetooth® connection, an Ethernet connection, a digital subscriber line (DSL) connection, a wireless fidelity (Wi-Fi) connection, a telephone line connection, a coaxial cable system, a satellite system, a line-of-site wireless system, a cellular telephone system, etc. For example, the interface resource 114 may be implemented by any type of interface standard, such as a Bluetooth® interface, an Ethernet interface, a Wi-Fi interface, a universal serial bus (USB), a near field communication (NFC) interface, and/or a PCI express interface.

The computing system 102 includes the power source 118 to deliver power to resource(s) of the computing system 102. In this example, the power source 118 implements a power delivery network. For example, the power source 118 may implement an alternating current-to-direct current (AC/DC) power supply. In some examples, the power source 118 may be coupled to a power grid infrastructure such as an AC main (e.g., a 110 volt (V) AC grid main, a 220 V AC grid main, etc.). Additionally or alternatively, the power source 118 may be implemented by a battery. For example, the power source 118 may be a limited energy device, such as a lithium-ion battery or any other chargeable battery or power source. In such examples, the power source 118 may be chargeable using a power adapter or converter (e.g., an AC/DC power converter), a wall outlet (e.g., a 110 V AC wall outlet, a 220 V AC wall outlet, etc.), etc.

The computing system 102 of the illustrated example of FIG. 1 includes the datastore 120 to record data (e.g., the telemetry data 122, the ML model(s) 124, etc.). The datastore 120 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 120 may additionally or alternatively be implemented by one or more double data rate (DDR) memories, such as DDR, DDR2, DDR3, DDR4, mobile DDR (mDDR), etc. The datastore 120 may additionally or alternatively be implemented by one or more mass storage devices such as hard disk drive(s), compact disk (CD) drive(s), digital versatile disk (DVD) drive(s), solid-state disk drive(s), etc. While in the illustrated example the datastore 120 is illustrated as a single datastore, the datastore 120 may be implemented by any number and/or type(s) of datastores. Furthermore, the data stored in the datastore 120 may be in any data format such as, for example, binary data, comma delimited data, tab delimited data, structured query language (SQL) structures, etc.

In the illustrated example of FIG. 1, the computing system 102 is in communication with the user interface 126. For example, the user interface 126 may be implemented by a graphical user interface (GUI), an application display, etc., which may be presented to a user on a display device in circuit with and/or otherwise in communication with the computing system 102. In such examples, a user (e.g., a developer, an IT administrator, a customer, etc.) controls the computing system 102, configures collection or measurement intervals to obtain the telemetry data 122, configures, trains, and/or executes the ML model(s) 124, etc., via the user interface 126. Alternatively, the computing system 102 may include and/or otherwise implement the user interface 126.

In the illustrated example of FIG. 1, the guard band controller 104A-F, the CPU 106, the first acceleration resource 108, the second acceleration resource 110, the general purpose processing resource 112, the interface resource 114, the power source 118, and the datastore 120 are in communication with the bus 116. For example, the bus 116 corresponds to, is representative of, and/or otherwise includes at least one of an Inter-Integrated Circuit (I2C) bus, a Serial Peripheral Interface (SPI) bus, or a Peripheral Component Interconnect (PCI) bus. Additionally or alternatively, the bus 116 may implement any other type of computing or electrical bus.

In the illustrated example of FIG. 1, the network 128 is the Internet. However, the network 128 of this example may be implemented using any suitable wired and/or wireless network(s) including, for example, one or more data buses, one or more Local Area Networks (LANs), one or more wireless LANs, one or more cellular networks, one or more private networks, one or more public networks, etc. In some examples, the network 128 enables the computing system 102 to be in communication with one(s) of the external computing systems 130.

In the illustrated example of FIG. 1, the external computing systems 130 include and/or otherwise implement one or more computing devices on which the ML model(s) 124 is/are to be executed. In this example, the external computing systems 130 include an example desktop computer 132, an example mobile device (e.g., a smartphone, an Internet-enabled smartphone, etc.) 134, an example laptop computer 136, an example tablet (e.g., a tablet computer, an Internet-enabled tablet computer, etc.) 138, and an example server 140. In some examples, fewer or more computing systems than depicted in FIG. 1 may be used. Additionally or alternatively, the external computing systems 130 may include, correspond to, and/or otherwise be representative of any other type of computing device.

In some examples, one or more of the external computing systems 130 execute one(s) of the ML model(s) 124 to process a computing workload (e.g., an AI/ML workload). For example, the mobile device 134 can be implemented as a cell or mobile phone having one or more processors (e.g., a CPU, a GPU, a VPU, an AI or neural-network (NN) specific processor, etc.) on a single SoC to process an AI/ML workload using one(s) of the ML model(s) 124. In some examples, the desktop computer 132, the laptop computer 136, the tablet computer, and/or the server 140 may be implemented as computing device(s) having one or more processors (e.g., a CPU, a GPU, a VPU, an AI/NN specific processor, etc.) on one or more SoCs to process AI/ML workload(s) using one(s) of the ML model(s) 124. In some examples, the server 140 includes and/or otherwise is representative of one or more servers that can implement a central or data facility, a cloud service (e.g., a public or private cloud provider, a cloud-based repository, etc.), etc., to process AI/ML workload(s) using one(s) of the ML model(s) 124.

In the illustrated example of FIG. 1, the computing system 102 includes a first guard band controller 104A (e.g., a first instance of the guard band controller 104A-F), a second guard band controller 104B (e.g., a second instance of the guard band controller 104A-F), a third guard band controller 104C (e.g., a third instance of the guard band controller 104A-F), a fourth guard band controller 104D (e.g., a fourth instance of the guard band controller 104A-F), a fifth guard band controller 104E (e.g., a fifth instance of the guard band controller 104A-F), and a sixth guard band controller 104F (e.g., a sixth instance of the guard band controller 104A-F) (collectively referred to herein as the guard band controller 104A-F unless specified otherwise). In this example, the first guard band controller 104A is implemented by the CPU 106 (e.g., implemented by hardware, software, and/or firmware of the CPU 106) and the second guard band controller 104B is external to the CPU 106. For example, the second guard band controller 104B may be implemented by hardware, software, and/or firmware of the computing system 102. In such examples, the second guard band controller 104B may be implemented by one or more analog or digital circuit(s), logic circuits, programmable processor(s), programmable controller(s), GPU(s), DSP(s), ASIC(s), PLD(s), and/or FPLD(s)).

In the illustrated example of FIG. 1, the third guard band controller 104C is implemented by the first acceleration resource 108 (e.g., implemented by hardware, software, and/or firmware of the first acceleration resource 108). In this example, the fourth guard band controller 104D is implemented by the second acceleration resource 110 (e.g., implemented by hardware, software, and/or firmware of the second acceleration resource 110). In this example, the fifth guard band controller 104E is implemented by the interface resource 114 (e.g., implemented by hardware, software, and/or firmware of the interface resource 114). In this example, the sixth guard band controller 104F is implemented by the general purpose processing resource 112 (e.g., implemented by hardware, software, and/or firmware of the general purpose processing resource 112). Additionally or alternatively, one or more of the first guard band controller 104A, the second guard band controller 104B, the third guard band controller 104C, the fourth guard band controller 104D, the fifth guard band controller 104E, the sixth guard band controller 104F, and/or portion(s) thereof, may be virtualized, such as by being implemented with one or more containers, virtual machines, etc. Additionally or alternatively, one or more of the first guard band controller 104A, the second guard band controller 104B, the third guard band controller 104C, the fourth guard band controller 104D, the fifth guard band controller 104E, and/or the sixth guard band controller 104F may be implemented by different resource(s) of the computing system 102. Alternatively, the computing system 102 may not include one or more of the first guard band controller 104A, the second guard band controller 104B, the third guard band controller 104C, the fourth guard band controller 104D, the fifth guard band controller 104E, and/or the sixth guard band controller 104F.

In some examples, the guard band controller 104A-F collects and/or otherwise obtains the telemetry data 122 from resource(s) of the computing system 102. Example resources of the computing system 102 may include the CPU 106, the first acceleration resource 108, the second acceleration resource 110, the general purpose processing resource 112, the interface resource 114, the power source 118, the datastore 120, and/or component(s), portion(s), etc., respectively thereof. In some examples, the telemetry data 122 corresponds to, is representative of, and/or otherwise includes data (e.g., information, measurements, etc.) associated with a resource, such as quality-related information (e.g., hardware, firmware, and/or software parameters, statistics, etc.), configuration information (e.g., hardware, firmware, and/or software attributes or settings), or any other analytics-based data. As used herein, such quality-related information, configuration information, and/or analytics-based data is generally referred to as telemetry (e.g., the telemetry data 122, telemetry information, etc.).

In some examples, the telemetry data 122 includes resource utilization information associated with the utilization of the resource(s) (e.g., hardware resources, software resources, virtual hardware and/or software resources, etc.) and/or the efficiency with which those resources are able to meet the demands placed on them. For example, the telemetry data 122 can include a utilization (e.g., a percentage of a resource that is utilized or not utilized), a delay (e.g., an average delay) in receiving a computation task for execution (e.g., latency), a rate (e.g., an average rate) at which a resource is available (e.g., bandwidth, throughput, etc.), power expenditure, a residency (e.g., a time duration at which the resource is at or within a range of a utilization), etc., associated with one(s) of the resource(s) of the computing system 102.

In some examples, the telemetry data 122 can include first compute utilization data corresponding to a percentage of the CPU 106 being utilized, a second compute utilization corresponding to a percentage of the first acceleration resource 108 being utilized, etc. In such examples, the first compute utilization data, the second compute utilization data, etc., may include time data (e.g., time durations, time stamps, etc.) identifying a quantity of time at which the CPU 106 is utilized at a specific utilization percentage or within a range of a utilization percentage. In some such examples, the first compute utilization data, the second compute utilization data, etc., may include workload data such as a type of instruction being executed by the CPU 106, the first acceleration resource 108, etc., that corresponds to the utilizations of the CPU 106, the first acceleration resource 108, etc.

In some examples, the telemetry data 122 can include storage utilization data corresponding to a percentage or other quantifier of the datastore 120 being utilized. In some examples, the telemetry data 122 can include cache utilization data associated with cache memory of the CPU 106 being utilized, memory utilization data (e.g., volatile memory utilization data, non-volatile memory utilization data, etc.), etc., associated with memory of the computing system 102 being utilized, etc. Additionally or alternatively, the telemetry data 122 may include any other data associated with utilization(s) of resource(s) of the computing system 102.

In some examples, the guard band controller 104A-F determines a likelihood that resource(s) of the computing system 102 is/are executing a type of a workload, a phase of the workload, etc., based on the telemetry data 122. For example, the workload may be representative of one or more processes, applications, services, etc., that may be executed by one or more resources of the computing system 102. For example, the guard band controller 104A-F may determine that the computing system 102 is likely executing a first type of workload, which may correspond to a relatively high computationally-intensive application, a second type of workload, which may correspond to a relatively medium computationally-intensive application, a third type of workload, which may correspond to a relatively low computationally-intensive application, etc. For example, the first type of workload may correspond to a high or intense demand on the resource(s) (e.g., processor(s), memory, storage, etc., having a relatively high utilization (e.g., 60% utilized, 80% utilized, etc.)). In some examples, the first type of workload may correspond to executing AI/ML tasks, computer modeling or simulation tasks (e.g., computer-aided design (CAD) software tools, CAD modeling software tools, etc.), content creation tasks such as audio, graphics, and/or video generation (e.g., audio, graphics, and/or video design software).

In some examples, the second type of workload may correspond to a medium, average, and/or otherwise typical demand on the resource(s) (e.g., processor(s), memory, storage, etc., having a relatively medium, moderate, and/or typical utilization (e.g., 40% utilized, 50% utilized, etc.)). For example, the second type of workload may correspond to entertainment-based applications, such as streaming audio and/or video, presenting stored audio and/or video, etc. In some examples, the third type of workload may correspond to a low or weak demand on the resource(s) (e.g., processor(s), memory, storage, etc., having a relatively medium, average, and/or typical utilization (e.g., 10% utilized, 20% utilized, etc.)). For example, the third type of workload may correspond to browsing applications (e.g., Internet browsing applications), word processing applications, spreadsheet processing applications, etc. In some examples, the relatively high level of demand is greater than the relatively medium level of demand, and the relatively medium level of demand is greater than the relatively low level of demand. Additionally or alternatively, there may be fewer or more types of workloads than described herein.

In some examples, the telemetry data 122 includes instruction data such as data associated with an execution of a machine readable instruction by a resource. For example, the instruction data may include an indication whether a resource is executing or retiring an instruction, executing a logical cycle, executing a reference cycle, executing a call, executing a direct call, executing a service (e.g., a firmware and/or software service) or process (e.g., a firmware and/or software process) (e.g., a particular or specified service or process of interest), etc. In some examples, the telemetry data 122 includes performance counter data such as value(s) of a hardware counter (e.g., a hardware performance counter), a software counter (e.g., a software performance counter), etc., that is used to monitor a function of the resource. For example, the telemetry data 122 may include value(s) of one or more counters implemented by a performance monitoring unit (PMU) of the CPU 106. In some examples, the instruction data includes a quantity of read/write cycles executed by the datastore 120 or portion(s) or partition(s) thereof, a latency of the datastore 120, a percentage or portion of the datastore 120 that is available to execute a storage task, etc.

In some examples, the telemetry data 122 includes voltage droop data. For example, a core of the CPU 106 may include a droop monitor circuit that measures a voltage droop of the core, and/or, more generally, the CPU 106. In such examples, the droop monitor circuit can determine a voltage droop based on an input voltage and/or output voltage of the core (e.g., a voltage difference between the input voltage and the output voltage, a ratio of the input voltage and the output voltage). In some examples, the droop monitor circuit, and/or, more generally, the core of the CPU 106, may transmit the voltage droop data (e.g., analog and/or digital data corresponding to a voltage droop) to the guard band controller 104A-F.

In some examples, the ML model(s) 124 may be implemented with a neural network. Alternatively, any other type of AI/ML model may be used to implement the one or more ML model(s) 124. In some examples, the ML model(s) 124 are trained using unsupervised clustering. Alternatively, the ML model(s) 124 may be trained using any other type of AI/ML training such as stochastic gradient descent.

In some examples, the guard band controller 104A-F utilizes the ML model(s) 124 to classify a workload, a phase of the workload, etc., executed by one(s) of the resource(s) of the computing system 102, and/or, more generally, the computing system 102, based on the telemetry data 122. For example, the guard band controller 104A-F may execute the ML model(s) 124 to identify a type of the workload being executed by resource(s) of the computing system 102. In some examples, the guard band controller 104A-F may provide instruction data, utilization data, voltage droop data, etc., included in the telemetry data 122 to the ML model(s) 124 as inputs to determine one or more outputs. For example, the ML model(s) 124 may output an identification of a workload type, an identification of a phase of the workload type, a determination of a guard band that corresponds to the workload type and/or phase for the resource, etc., and/or a combination thereof based on the inputs.

In some examples, the guard band controller 104A-F determines an adjustment to a guard band of a resource based on at least one of the classification of the workload, the phase of the workload, or the determined guard band. For example, the guard band controller 104A-F may determine to decrease a guard band of the CPU 106 to improve performance based on a classification of the phase, the workload, etc. In some examples, the guard band controller 104A-F may determine to increase the guard band of the CPU 106 to improve reliability of the CPU 106 based on the classification of the phase, the workload, etc. Advantageously, in some examples, the guard band controller 104A-F improves the performance of the computing system 102 by allocating power from a decrease in the guard band of a resource to an increase in an operating frequency of the resource based on at least one of the classification of the workload or the phase of the workload based on the telemetry data 122 or portion(s) thereof. Thus, in some such examples, the guard band controller 104A-F effectuates one or more improvement(s) in the functioning of a computer, such as the computing system 102.

Figure 2:
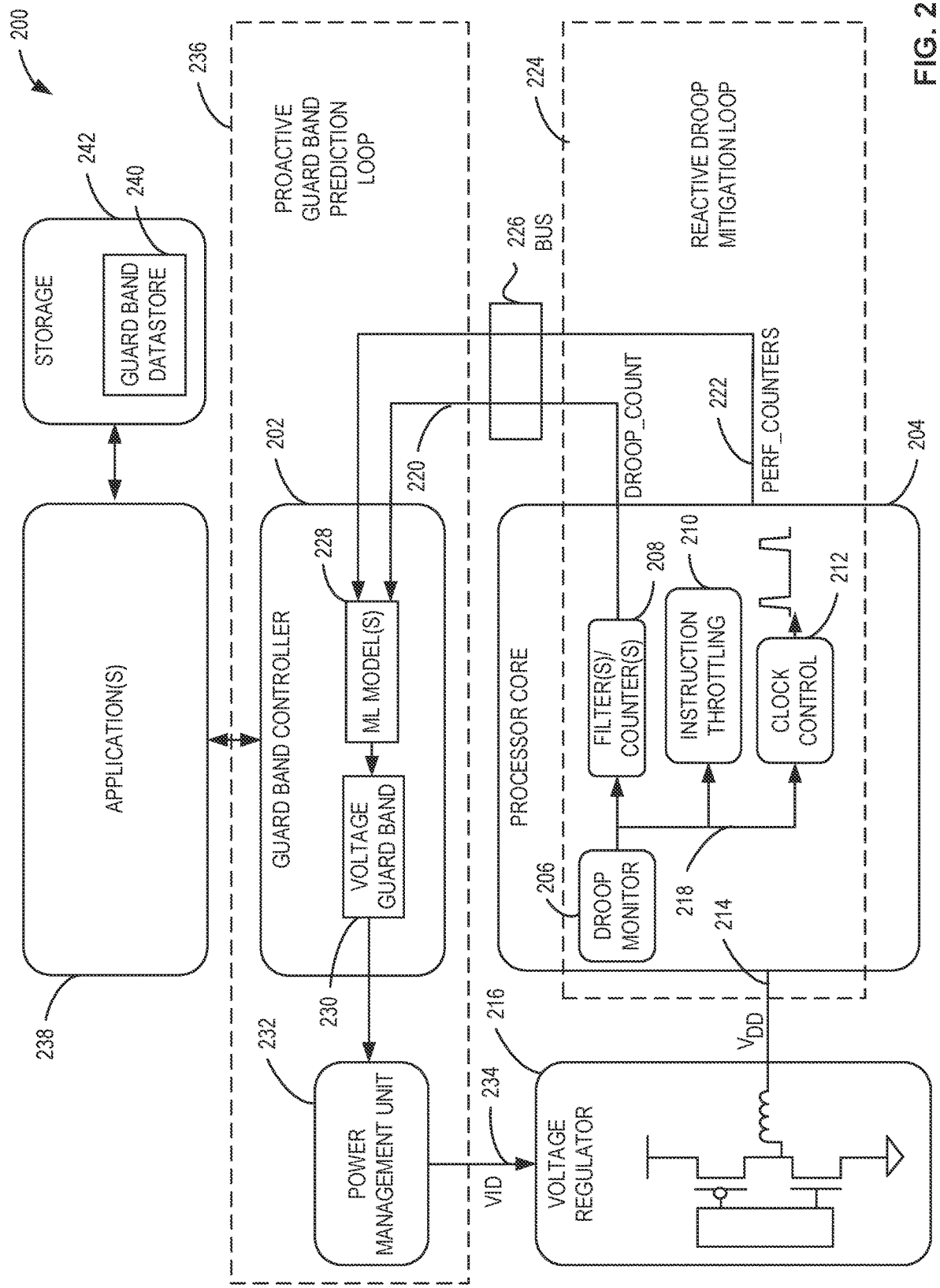
FIG. 2 is an illustration of an example system including example droop monitor circuitry, an example implementation of the example guard band controller of FIG. 1, and an example processor core of the example computing system of FIG. 1.

FIG. 2 is an illustration of an example system 200 including an example guard band controller 202 and an example processor core 204. In this example, the system 200 may implement a voltage droop monitoring system to measure and/or otherwise monitor a voltage droop of the processor core 204. In this example, the system 200 may implement a guard band control system to determine and configure an optimized guard band for the processor core 204 by executing the ML model(s) 124 of FIG. 1 based on the telemetry data 122 of FIG. 1 associated with the processor core 204 as inputs to the ML model(s) 124. In some examples, the guard band controller 202 may be an example implementation of the guard band controller 104A-F of FIG. 1. In some examples, the processor core 204 may be an example implementation of a core of the CPU 106 of FIG. 1. Alternatively, the processor core 204 may be an example implementation of a core, an execution unit, a logic unit, etc., of the first acceleration resource 108, the second acceleration resource 110, the general purpose processing resource 112, the interface resource 114, etc., of FIG. 1.

In the illustrated example of FIG. 2, the processor core 204 includes example droop monitor circuitry (e.g., voltage droop monitor circuitry) 206, example voltage droop processing circuitry 208, example instruction throttling circuitry 210, and example clock control circuitry 212. In this example, output(s) (e.g., one or more output terminals) of the droop monitor circuitry 206 is/are coupled to input(s) (e.g., one or more input terminals) of the voltage droop processing circuitry 208, the instruction throttling circuitry 210, and the clock control circuitry 212. In this example, output(s) (e.g., one or more output terminals) of the voltage droop processing circuitry 208 is/are coupled to the guard band controller 202. In this example, the voltage droop processing circuitry 208 is implemented with one or more filters and/or counters (e.g., hardware counters, performance counters, etc.). In this example, the instruction throttling circuitry 210 can be implemented with one or more analog or digital circuit(s), logic circuits, programmable processor(s), programmable controller(s), GPU(s), DSP(s), ASIC(s), PLD(s), and/or FPLD(s). In this example, the clock control circuitry 212 can be implemented with a phase-lock loop circuit. Additionally or alternatively, the clock control circuitry 212 may be implemented with one or more analog or digital circuit(s), logic circuits, programmable processor(s), programmable controller(s), GPU(s), DSP(s), ASIC(s), PLD(s), and/or FPLD(s).

In the illustrated example of FIG. 2, the droop monitor circuitry 206 may be implemented with one or more tunable replica circuits. For example, one(s) of the one or more tunable replica circuits may be implemented with one or more digital delay paths and/or one or more time-to-digital converters to generate multi-bit timing margin measurement(s). Additionally or alternatively, the droop monitor circuitry 206 may be implemented with one or more analog or digital circuit(s), logic circuits, programmable processor(s), programmable controller(s), GPU(s), DSP(s), ASIC(s), PLD(s), and/or FPLD(s).

In the illustrated example of FIG. 2, the droop monitor circuitry 206 obtains a measurement of an example voltage (e.g., input voltage, supply voltage, etc.) ($V_{DD}$) 214 from an example voltage regulator 216. In this example, output(s) (e.g., one or more output terminals) of the voltage regulator 216 are coupled to input(s) (e.g., one or more input terminals) of the processor core 204. In this example, the voltage regulator 216 can be implemented with an integrated voltage regulator (IVR) (e.g., a fully integrated voltage regulator FIVR)), a power management integrated circuit (PMIC), or any other type of voltage regulator circuitry or module. For example, the voltage regulator 216 may be a buck converter that provides the processor core 204 with an appropriate supply voltage such as by converting a +5 V DC or +12 V DC to a lower voltage required by the processor core 204 with the correct operating voltage.

In some examples, the droop monitor circuitry 206 implements example means for measuring a voltage droop associated with a hardware resource, where the voltage droop may be based on an execution of a workload by the hardware resource. For example, the means for measuring may be implemented by executable instructions such as that implemented by at least blocks 816 and/or 818 of FIG. 8. In some examples, the executable instructions of blocks 816 and/or 818 of FIG. 8 may be executed on at least one processor such as the example processor 1312 of FIG. 13. In other examples, the means for measuring is implemented by hardware logic, hardware implemented state machines, logic circuitry, and/or any other combination of hardware, software, and/or firmware. For example, the means for measuring may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the voltage regulator 216 implements example means for delivering a voltage to a hardware resource based on a voltage identification definition. For example, the means for delivering may be implemented by hardware logic, hardware implemented state machines, logic circuitry, and/or any other combination of hardware, software, and/or firmware. For example, the means for delivering may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the droop monitor circuitry 206 determines an example digital code (VDROOP) 218 based on the measurement of the voltage 214. In some examples, the digital code 218 corresponds to and/or otherwise indicates the voltage 214. For example, the digital code 218 may be implemented with a multi-bit timing margin measurement. In this example, the droop monitor circuitry 206. In some examples, the droop monitor circuitry 206 provides and/or otherwise delivers the digital code 218 to at least one of the voltage droop processing circuitry 208, the instruction throttling circuitry 210, or the clock control circuitry 212.

In some examples, the processor core 204 compares the digital code 218 to one or more pre-set thresholds, which may be used to determine when to trigger a fast voltage droop response (e.g., one or more mitigation actions). For example, the digital code 218 may implement a multi-bit timing margin measurement. In such examples, the processor core 204 can compare the multi-bit timing margin measurement to a first threshold (e.g., a first timing margin threshold, a first multi-bit timing margin measurement threshold, etc.), a second threshold, a third threshold, etc. For example, the processor core 204 may invoke the instruction throttling circuitry 210 to effectuate instruction throttling to reduce the dynamic capacitance (Cdyn), which may reduce the dynamic power consumed by the processor core 204. In some examples, the processor core 204 invokes the instruction throttling circuitry 210 in response to the multi-bit timing margin measurement satisfying the first threshold based on the voltage droop indicated by the multi-bit timing margin measurement being greater than the first threshold.

In some examples, the processor core 204 may invoke the clock control circuitry 212 to effectuate fine-grained clock gating or clock skipping to reduce the operating frequency of the processor core 204, which may reduce the dynamic power consumed by the processor core 204. For example, the clock control circuitry 212, when invoked, may skip one or more clock cycles to reduce a frequency of the processor core 204, which in turn, affects power consumption by reducing the power consumption. In some examples, the processor core 204 invokes the clock control circuitry 212 in response to the multi-bit timing margin measurement satisfying the first threshold and/or the second threshold based on the voltage droop indicated by the multi-bit timing margin measurement being greater than the first threshold and/or the second threshold.

In some examples, the processor core 204 may invoke pipeline stalling to occur to temporarily stall the pipeline (e.g., the instruction pipeline, the execution pipeline, etc.), which may cause a reduction in the dynamic power consumed by the processor core 204. In some examples, the processor core 204 invokes the pipeline stalling to occur in response to the multi-bit timing margin measurement satisfying the first threshold, the second threshold, and/or the third threshold based on the voltage droop indicated by the multi-bit timing margin measurement being greater than the first threshold, the second threshold, and/or the third threshold. For example, the processor core 204 may generate one or more signals that, when generated, prevent the pipeline from executing a workload (e.g., executing one or more machine readable instructions). In some examples, the processor core 204 may insert a no operation instruction (e.g., a no-op instruction, a NOP instruction, a NOOP instruction, etc.) in data to be executed by one or more execution units of the processor core 204. For example, the processor core 204 may insert a no-op assembly language instruction that, when executed by the one or more execution units of the processor core 204, causes the processor core 204 to take a defined number of clock cycles to execute the no-op assembly language instruction, which effectively stalls the pipeline for the defined number of clock cycles. In some examples, the no-op assembly language instruction, when executed by the one or more execution units of the processor core 204, does not change the state of any of the programmer-accessible registers, status flags, memory, etc., associated with the processor core 204.

In some examples, the droop monitor circuitry 206, the instruction throttling circuitry 210, the clock control circuitry 212, and/or, more generally, the processor core 204, implements example means for executing a mitigation action associated with a hardware resource in response to a voltage droop satisfying a threshold. For example, the means for executing may be implemented by executable instructions such as that implemented by at least blocks 818 and/or 820 of FIG. 8 and/or one(s) of blocks 1202, 1204, 1206, 1208, 1210, 1212, and/or 1214 of FIG. 12. In some examples, the executable instructions of blocks 818 and/or 820 of FIG. 8 and/or one(s) of blocks 1202, 1204, 1206, 1208, 1210, 1212, and/or 1214 of FIG. 12 may be executed on at least one processor such as the example processor 1312 of FIG. 13. In other examples, the means for executing is implemented by hardware logic, hardware implemented state machines, logic circuitry, and/or any other combination of hardware, software, and/or firmware. For example, the means for executing may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the processor core 204 provides telemetry data, such as the telemetry data 122 of FIG. 1, to the guard band controller 202. For example, the processor core 204 may provide the telemetry data 122 to include example voltage droop data (DROOP_COUNT) 220 and/or example performance counter data (PERF_ COUNTERS) 222. In this example, the voltage droop processing circuitry 208 may determine and/or otherwise output the voltage droop data 220 based on the digital code 218. For example, the voltage droop processing circuitry 208 may pass the digital code 218 through one or more filters or filter circuits to generate the voltage droop data 220. In some examples, the voltage droop data 220 may include a digital code or value corresponding to an analog value or representation of the voltage droop of the processor core 204.

In the illustrated example of FIG. 2, the processor core 204 may determine and/or otherwise output the performance counter data 222 based on the digital code 218. For example, the processor core 204 may manage and/or otherwise have one or more hardware counters that may correspond to statistical data associated with the voltage droop of the processor core 204. In such examples, the processor core 204 may implement the one or more hardware counters with a performance monitoring unit or other counter monitoring circuitry. In some examples, the processor core 204 may include a first counter (e.g., a first hardware counter) that stores a value indicative of an average number of voltage droops during a time period of interest, a second counter (e.g., a second hardware counter) that stores a value indicative of a minimum or maximum voltage droop value measured during a time period of interest, etc.

In some examples, the droop monitor circuitry 206, the voltage droop processing circuitry 208, the instruction throttling circuitry 210, and the clock control circuitry 212 implement an example reactive droop mitigation loop 224. Advantageously, the reactive droop mitigation loop 224 may be implemented to respond relatively quickly (e.g., at a response rate of one nanosecond, five nanoseconds, ten nanoseconds, etc.) to relatively large voltage droops and prevent failure of the processor core 204. In some examples, the reactive droop mitigation loop 224 may not be invoked often as large voltage droops may be expected to be very rare events because the guard band controller 202 may dynamically adapt the guard band of the processor core 204 to predict and prevent such voltage droops.

In the illustrated example of FIG. 2, the guard band controller 202 obtains the voltage droop data 220 and/or the performance counter data 222 from the processor core 204 via an example bus 226. For example, the bus 226 of FIG. 2 may implement the bus 116 of FIG. 1. In some examples, the guard band controller 202 executes ML-based workload and/or workload phase prediction by executing one or more example ML models 228. In some examples, the ML model(s) 228 may implement the ML model(s) 124 of FIG. 1. For example, the ML model(s) 228 may be a neural network (e.g., an ANN, a CNN, a DNN, etc.).

In this example, the guard band controller 202 invokes the ML model(s) 228 to determine an example voltage guard band 230. The guard band controller 202 may provide the voltage guard band 230 to an example power management unit 232. In some examples, the power management unit 232 may be implemented by one or more analog or digital circuit(s), logic circuits, programmable processor(s), programmable controller(s), GPU(s), DSP(s), ASIC(s), PLD(s), and/or FPLD(s)). For example, the power management unit 232 may be implemented as power management circuitry.

In some examples, the power management unit 232 may convert the voltage guard band 230 to an example voltage identification definition (VID) 234. The voltage regulator 216 may control the voltage 214 based on the VID 234. In some examples, the VID 234 may be implemented with digital signals indicative of a number of bits. For example, the power management unit 232 may generate the digital signals as command(s) to be provided to the voltage regulator 216. In response to obtaining the VID 234, the voltage regulator 216 may be instructed to generate the voltage 214 based on the VID 234.

In some examples, the power management unit 232 implements example means for determining a voltage identification definition based on a value of a guard band. For example, the means for determining may be implemented by executable instructions such as that implemented by at least blocks 816 and/or 818 of FIG. 8. In some examples, the executable instructions of blocks 816 and/or 818 of FIG. 8 may be executed on at least one processor such as the example processor 1312 of FIG. 13. In other examples, the means for determining is implemented by hardware logic, hardware implemented state machines, logic circuitry, and/or any other combination of hardware, software, and/or firmware. For example, the means for determining may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the guard band controller 202 and the power management unit 232 implement an example proactive guard band prediction loop 236. For example, the proactive guard band prediction loop 236 may tune the available safety margins according to the phase of workload operations executed by the processor core 204 based on the presence of the reactive droop mitigation loop 224. For example, the reactive droop mitigation loop 224 may provide a safety net or backup mitigation measure in response to a critical voltage droop experienced by the processor core 204. In some examples, the guard band controller 202, and/or, more generally, the proactive guard band prediction loop 236, executes workload fingerprinting techniques to identify a phase of a workload and tunes the safety margins for energy efficiency while minimizing and/or otherwise reducing the probability of voltage droop occurrence. Advantageously, the guard band controller 202, and/or, more generally, the proactive guard band prediction loop 236, may enable a phase-oriented fingerprint-assisted and mitigation-loop protected control process that optimizes between energy-savings, probability of critical voltage droop occurrence, and acceptable performance loss.

In some examples, the guard band controller 202 identifies a fingerprint of a workload, a phase of the workload, etc., based on at least one of the telemetry data 122, the voltage droop data 220, or the performance counter data 222. For example, a workload fingerprint, a phase fingerprint, etc., may correspond to a resource utilization, a residency, etc., or any other type of telemetry data. For example, the guard band controller 202 may estimate the workload, the phase, etc., in response to identifying the fingerprint and may identify safe voltage margins that may be applied for the identified phase. Advantageously, the guard band controller 202 may operate to anticipate and reconfigure process variables associated with the processor core 204 ahead of variation in demand of the processor core 204. Advantageously, the guard band controller 202 may use phase identification to predict the future phases of a workload during the execution of the workload, which may prevent a reactive response to a change in behavior of the workload.

In the illustrated example of FIG. 2, the guard band controller 202 may be in communication with one or more example applications 238. For example, the application(s) 238 may be implemented with one or more software applications, routines, processes, etc. In some examples, the application(s) 238 may provide kernel support to facilitate communication with the guard band controller 202. In some examples, the application(s) 238 may implement the user interface 126 of FIG. 1.

In some examples, the guard band controller 202 and/or the application(s) 238 may train the ML model(s) 228. For example, the application(s) 238 may support mining the optimal safety margins for specific phases in a workload of a resource, such as the processor core 204, without needing any prior knowledge of behavior of the workload. For example, a workload may be implemented with and/or otherwise correspond to an application with specialized objectives (e.g., queries, searches, analyses, etc.), which may undergo one or more execution phases while operating under one or more constraints (e.g., some workloads require more accelerator, compute or processing, memory, storage, and/or interface resources). In some examples, the application(s) 238 may determine optimal safety margins based on an execution of complex decisions due to a variety of degrees of freedom for power and performance parameter tuning.

In example operation, the guard band controller 202 and/or the application(s) 238 may detect trends in the workload (e.g., based on the telemetry data 122) and make predictions about future workload attributes (e.g., one or more resource utilizations). If the target workload demonstrates a strong periodic behavior, the guard band controller 202 and/or the application(s) 238 may incorporate historic forecast to workload forecasting of the ML model(s) 228, which may allow the guard band controller 202 to determine the voltage guard band 230 to proactively react to the workload spikes in advance. In some examples, the guard band controller 202 and/or the application(s) 238 may execute fingerprinting techniques to identify distinct phases for a given type of workload, which may allow for optimal tuning and proactive provisioning of the voltage guard band 230 by forecasting the likelihood of resource demands, such as demand on the processor core 204.

In some examples, workload phases last for many milliseconds (ms) to seconds. For example, the guard band controller 202 and/or the application(s) 238 may determine coarse-grained estimates to act as an envelope within which the voltage guard band should operate for achieving energy optimization of a resource. In example operation, the likelihood of phase transitions act as a feedback for voltage droop margin reconfiguration based on the knowledge of phase specific resource utilization. For example, each phase may have a distinctive characteristic (e.g., a Gaussian Distribution of resource utilization) of its own and transitions to another phase with a certain likelihood. Advantageously, once the guard band controller 202 and/or the application(s) 238 characterizes the phase transition behavior with the ML model(s) 228, the sequence of phases can be predicted according to the time spent in each phase (e.g., a residency, a phase residency, etc.). In some examples, the guard band controller 202 and/or the application(s) 238 may tune each phase to specific voltage margins to improve on conservative margins that may be typically implemented.

In some examples, the guard band controller 202 and/or the application(s) 238 may set initial values of the voltage guard bands 230 based on an ISA type (e.g., vector ISA, scalar ISA, etc.). In this example, the initial values of the voltage guard bands 230 may be stored in an example guard band datastore 240. In this example, the guard band datastore 240 is stored in example storage 242. For example, the storage 242 may implemented with volatile memory, non-volatile memory, etc., or any other type of memory or storage.

In some examples, the guard band datastore 240 may include and/or otherwise implement a phase-to-guard band look-up table. For example, the guard band datastore 240 may store safe operating values of the voltage guard band 230 per phase. In some examples, as a part of pre-training of the ML model(s) 228, the values of the voltage guard band 230 are trained offline for various phases of the workloads to tune the values of the voltage guard band 230 to implement adaptive guard bands. For example, the guard band controller 202 and/or the application(s) 238 may train the ML model(s) 228 to tune the values of the voltage guard band 230 using voltage droop feedback (e.g., the voltage droop data 220, the performance counter data 222, etc.) for a given computing platform and/or workload type.

In some examples, the guard band controller 202 and/or the application(s) 238 store values of the voltage guard band 230 after pre-training is completed. In some examples, during runtime, the application(s) 238 (e.g., an operating system (OS) of the application(s) 238) may import the pre-trained values of the voltage guard band 230 from the guard band datastore 240 to the ML model(s) 228. During runtime, the guard band controller 202 and/or the application(s) 238 may adjust (e.g., incrementally adjust) values of the voltage guard band 230 stored in the guard band datastore 240 in substantially real time to minimize the overprovisioning of the safety margins while the system 200 is initializing and learning to explore the sufficient safety margins as it changes its phases of workload operation.

In some examples, the guard band datastore 240 adapts based on the voltage droop response to the workload phase residency and transition patterns (e.g., fingerprints, workload fingerprints, phase fingerprints, etc.). For example, the guard band controller 202 and/or the application(s) 238 may update relationship(s), associations(s), etc., between phase(s) and corresponding values of the voltage guard band 230. In some examples, the guard band controller 202 and/or the application(s) 238 invoke the update(s) response to the reactive droop mitigation loop 224 being triggered and causing mitigation measure(s) to be performed. In some such examples, the proactive guard band prediction loop 236 may trigger re-training with the new pattern (e.g., phase variations) and re-adjust the values of voltage guard band 230 per phase in the guard band datastore 240 to ensure the latest data is saved in the storage 242 when the system 200 is powered off. In some examples, the proactive guard band prediction loop 236 of a first resource, such as the processor core 204, may trigger re-training of the ML model(s) 228, which may be distributed to a second resource, such as a resource of one(s) of the external computing systems 130 of FIG. 1.

In some examples, in response to sufficient hardening of the ML model(s) 228 based on the values of the voltage guard band 230 stored in the guard band datastore 240 using persistent training, the guard band controller 202 may forecast each phase. For example, the guard band controller 202 may forecast a phase based on an existing or instant phase of the processor core 204 and a phase likelihood matrix. In some examples, the phase likelihood matrix may be implemented with a table of probabilities that the processor core 204 is operating in a particular phase based on telemetry data, such as the telemetry data 122 of FIG. 1. In some examples, in response to a transition from one workload phase to another, the ML model(s) 228 may provide and/or otherwise identify trained values of the voltage guard band 230 for the newly transitioned phase. Advantageously, the trained values for the newly transitioned phase may implement a value of the voltage guard band 230 that may be provided to the power management unit 232 to trigger a re-configuration of the voltage guard band of the processor core 204 to achieve power savings and/or increased performance.

Advantageously, the system 200 of the illustrated example of FIG. 2 allows for the simultaneous learning and updating and proactively setting the safety margins of the processor core 204 as the phases change from one phase to another and thereby reinforcing the relationship(s) between phase(s) and safety margin(s) for the workload being executed. Advantageously, the system 200 hardens the phase-safety margin relationship(s) by re-training the ML model(s) 228 based on previous data. The guard band controller 202 may execute the re-trained versions of the ML model(s) 228 to set a corrected value of the voltage guard band 230. Advantageously, after some time, convergence may be reached for re-training the ML model(s) 228, and the number of voltage droops of the processor core 204 may decrease due to a higher percentage of correct safety margin settings. Advantageously, as the system 200 operates over time, the ML model(s) 228 may be further corrected and hardened to account for concept drift.

Figure 3:
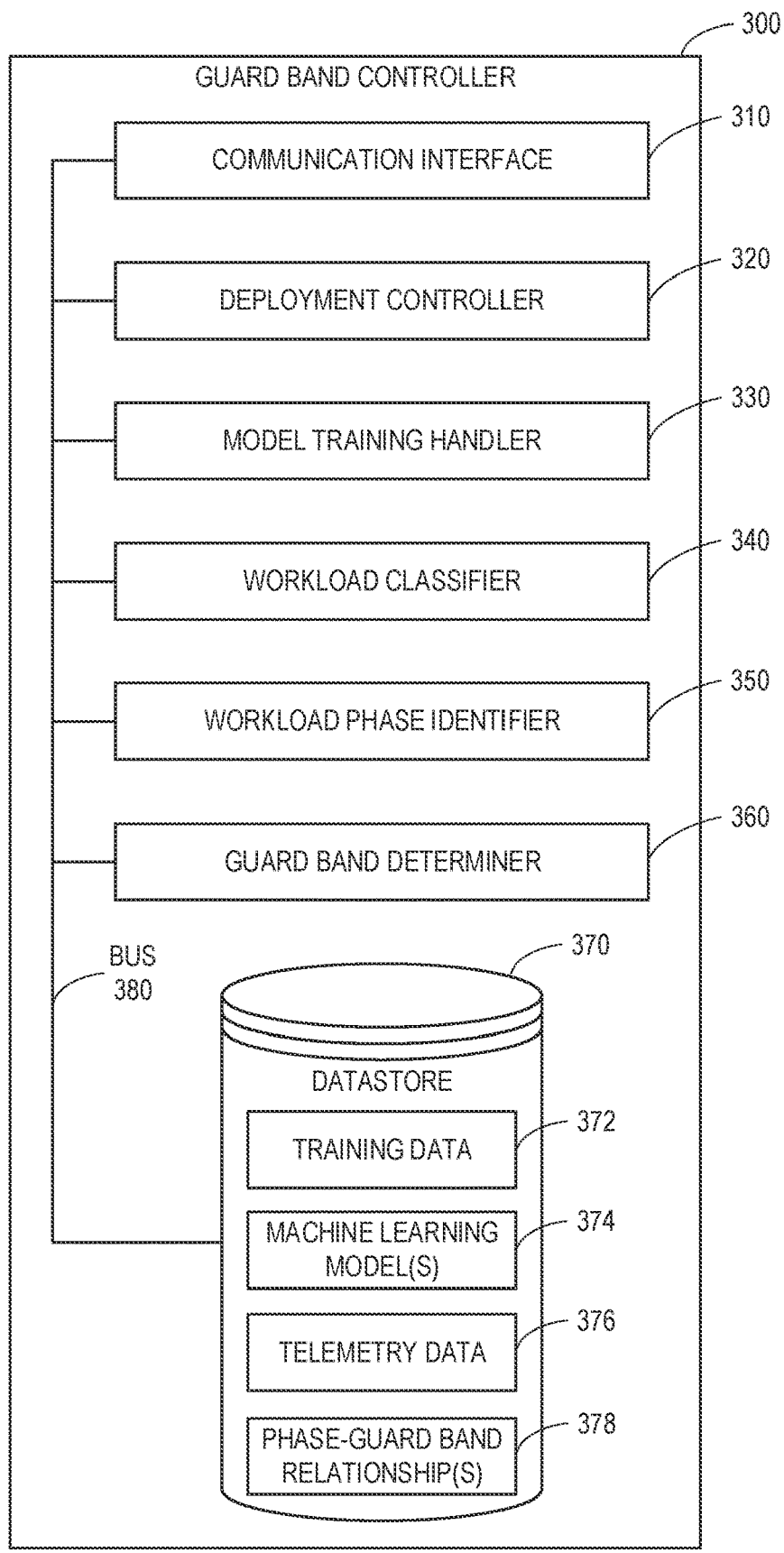
FIG. 3 is a block diagram of an example implementation of the example guard band controller of FIGS. 1 and/or 2.

FIG. 3 is a block diagram of an example guard band controller 300. In some examples, the guard band controller 300 of FIG. 3 may implement the guard band controller 104A-F of FIG. 1 and/or the guard band controller 202 of FIG. 2. In the illustrated example of FIG. 3, the guard band controller 300 includes an example communication interface 310, an example deployment controller 320, an example model training handler 330, an example workload classifier 340, an example workload phase identifier 350, an example guard band determiner 360, an example datastore 370, and an example bus 380. In this example, the datastore 370 stores example training data 372, example machine learning model(s) 374, example telemetry data 376, and example phase-guard band relationship(s) 378. In this example, one(s) of the communication interface 310, the deployment controller 320, the model training handler 330, the workload classifier 340, the workload phase identifier 350, the guard band determiner 360, and the datastore 370 may be in communication with each other via the bus 380. In some examples, the bus 380 may implement the bus 116 of FIG. 1 and/or the bus 226 of FIG. 2.

In the illustrated example of FIG. 3, the guard band controller 300 includes the communication interface 310 to obtain resource utilization data corresponding to a workload type. For example, the communication interface 310 may obtain the telemetry data 122 of FIG. 1 that corresponds to at least one of the CPU 106, the first acceleration resource 108, the second acceleration resource 110, the general purpose processing resource 112, the interface resource 114, the power source 118, or the datastore 120. In some examples, the communication interface 310 may obtain the telemetry data 122 via the bus 380.

In some examples, the communication interface 310 obtains the telemetry data 122 including compute utilization data, which may correspond to one or more types of a workload. For example, the communication interface 310 may obtain compute utilization data from, and/or otherwise associated with, the CPU 106 of FIG. 1, the processor core 204 of FIG. 2, etc. In some such examples, the compute utilization data may indicate a utilization of the CPU 106, the processor core 204, etc. In some examples, the communication interface 310 may obtain first compute utilization data of the CPU 106 corresponding to a first type of workload (e.g., a streaming video workload), second compute utilization data of the CPU 106 corresponding to a second type of workload (e.g., an Internet browsing workload), etc.

In some examples, the communication interface 310 obtains the telemetry data 122 including storage utilization data, which may correspond to one or more types of a workload. For example, the communication interface 310 may obtain storage utilization data from, and/or otherwise associated with, the datastore 120 of FIG. 1, the guard band datastore 240 of FIG. 2, etc. In some such examples, the storage utilization data may indicate a utilization of the datastore 120, the guard band datastore 240, etc. In some examples, the communication interface 310 may obtain first storage utilization data associated with the datastore 120 corresponding to a first type of workload, second storage utilization data of the datastore 120 corresponding to a second type of workload, etc.

In some examples, the communication interface 310 obtains the telemetry data 122 including cache utilization data, which may correspond to one or more workload types. For example, the communication interface 310 may obtain cache utilization data from, and/or otherwise associated with cache memory of the computing system 102 of FIG. 1. In some such examples, the cache utilization data may indicate a utilization of the cache memory. In some examples, the communication interface 310 may obtain first cache utilization data of the cache memory corresponding to a first type of workload, second cache utilization data of the cache memory corresponding to a second type of workload, etc.

In some examples, the communication interface 310 obtains the telemetry data 122 including memory utilization data, which may correspond to one or more workload types. For example, the communication interface 310 may obtain memory utilization data from, and/or otherwise associated with volatile memory, non-volatile memory, etc., of the computing system 102 of FIG. 1. In some such examples, the memory utilization data may indicate a utilization of the volatile memory, non-volatile memory, etc. In some examples, the communication interface 310 may obtain first memory utilization data associated with the volatile memory, non-volatile memory, etc., corresponding to a first type of workload, second memory utilization data associated with the volatile memory, non-volatile memory, etc., corresponding to a second type of workload, etc.

In some examples, the communication interface 310 obtains the telemetry data 122 including acceleration utilization data, which may correspond to a plurality of workload types. For example, the communication interface 310 may obtain acceleration utilization data from, and/or otherwise associated with the first acceleration resource 108 of FIG. 1 and/or the second acceleration resource 110 of FIG. 1 of the computing system 102 of FIG. 1. In some such examples, the acceleration utilization data may indicate a utilization of the first acceleration resource 108 and/or the second acceleration resource 110. In some examples, the communication interface 310 may obtain first acceleration utilization data of the first acceleration resource 108 corresponding to a first type of workload, second acceleration utilization data of the first acceleration resource 108 corresponding to a second type of workload, etc.

In some examples, the communication interface 310 obtains the telemetry data 122 including interface utilization data, which may correspond to one or more of a plurality of workload types. For example, the communication interface 310 may obtain interface utilization data from, and/or otherwise associated with the interface resource 114 of FIG. 1 of the computing system 102 of FIG. 1. In some such examples, the interface utilization data may indicate a utilization of the interface resource 114. In some examples, the communication interface 310 may obtain first interface utilization data of the interface resource 114 corresponding to a first type of workload, second interface utilization data of the interface resource 114 corresponding to a second type of workload, etc.

In some examples, the communication interface 310 implements example means for obtaining telemetry data, which may include resource utilization data corresponding to a plurality of workload types. In some examples, the communication interface 310 implements example means for determining one or more telemetry parameters based on the telemetry data, which may be obtained from the resource. For example, the means for obtaining telemetry data may be implemented by executable instructions such as that implemented by at least block 904 of FIG. 9 and/or one(s) of blocks 1002, 1004, 1006, 1008, 1010, 1012, and 1014 of FIG. 10. In some examples, the means for determining one or more telemetry parameters may be implemented by executable instructions such as that implemented by at least block 806 of FIG. 8. In some examples, the executable instructions of blocks 806 of FIG. 8, the block 904 of FIG. 9, and/or one(s) of blocks 1002, 1004, 1006, 1008, 1010, 1012, and 1014 of FIG. 10 may be executed on at least one processor such as the example processor 1312 of FIG. 13. In other examples, the means for obtaining telemetry data and/or the means for determining one or more telemetry parameters is/are implemented by hardware logic, hardware implemented state machines, logic circuitry, and/or any other combination of hardware, software, and/or firmware. For example, the means for obtaining telemetry data and/or the means for determining one or more telemetry parameters may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 3, the guard band controller 300 includes the deployment controller 320 to deploy one or more machine learning models to one or more computing systems. In some examples, the deployment controller 320 may provide, transmit, and/or otherwise distribute the ML model(s) 124 to the computing system 102 of FIG. 1 and/or one or more of the external computing systems 130 of FIG. 1.

In some examples, the deployment controller 320 implements example means for deploying, means for distributing, etc., a machine learning model to one or more computing systems, where the machine learning model may be executed to identify a guard band of a resource based on an execution of a workload by the resource. For example, the means for distributing, the means for deploying, etc., the machine learning model may be implemented by executable instructions such as that implemented by at least block 804 of FIG. 8. In some examples, the executable instructions of block 804 of FIG. 8 may be executed on at least one processor such as the example processor 1312 of FIG. 13. In other examples, the means for distributing, the means for deploying, etc., the machine learning model is implemented by hardware logic, hardware implemented state machines, logic circuitry, and/or any other combination of hardware, software, and/or firmware. For example, the means for distributing, the means for deploying, etc., the machine learning model may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 3, the guard band controller 300 includes the model training handler 330 to train a machine learning model to determine a voltage guard band based on a workload. In some examples, the model training handler 330 selects a workload type of interest to process for training of an ML model, such as the ML model(s) 124 of FIG. 1 and/or the ML model(s) 228 of FIG. 2. For example, the model training handler 330 may retrieve the training data 372, which may be labeled training data, corresponding to a first type of workload, a second type of workload, etc. In some examples, in response to training the ML model(s) 124 of FIG. 1 and/or the ML model(s) 228 of FIG. 2 based on the first type of workload, the model training handler 330 may determine to train the ML model(s) 124 of FIG. 1 and/or the ML model(s) 228 of FIG. 2 based on the second type of workload.

In some examples, the model training handler 330 generates a trained ML model based on at least one of resource utilization phase(s), label(s), or guard band(s). For example, the model training handler 330 may generate and/or otherwise output trained versions of the ML model(s) 124 and/or the ML model(s) 228. In some examples, the model training handler 330 may generate the ML model(s) 124 based on a residency or time duration that a resource operates at a specific utilization or within a utilization range during a phase. In some examples, the model training handler 330 may generate the ML model(s) 124 based on a label that is assigned to the phase. In some examples, the model training handler 330 may generate the ML model(s) 124 based on a classification of the phase. In some examples, the model training handler 330 may generate the ML model(s) 124 based on a probability that the resource is operating in the phase based on the utilization or utilization range, the residency, etc., and/or a combination thereof. In some examples, the model training handler 330 may generate the ML model(s) 124 based on a value of the voltage guard band 230 of FIG. 2 that is associated with the phase, the label, the probability, or the classification.

In some examples, the model training handler 330 implements example means for training a machine learning model, which may be executed to identify a guard band of a resource based on an execution of a workload by the resource. For example, the means for training the machine learning model may be implemented by executable instructions such as that implemented by at least block 802 of FIG. 8 and/or blocks 902, 916, and/or 918 of FIG. 9. In some examples, the executable instructions of block 802 of FIG. 8 and/or blocks 902, 916, and/or 918 of FIG. 9 may be executed on at least one processor such as the example processor 1312 of FIG. 13. In other examples, the means for training the machine learning model is implemented by hardware logic, hardware implemented state machines, logic circuitry, and/or any other combination of hardware, software, and/or firmware. For example, the means for training the machine learning model may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 3, the guard band controller 300 includes the workload classifier 340 to determine telemetry parameters based on telemetry data obtained from resource(s) of a computing system, such as the computing system 102 of FIG. 1. In some examples, the workload classifier 340 determines telemetry parameters such as a utilization of a resource, a residency of the utilization, etc., based on the telemetry data 122 of FIG. 1. For example, the workload classifier 340 may determine that the CPU 106 operated at 90% utilization while executing a portion of a workload, which may include executing one or more AVX instructions. In some examples, the workload classifier 340 may determine that the portion of the workload corresponds to a phase of the workload and that a residency of the phase is 500 ms. For example, the workload classifier 340 may determine that the CPU 106 operated at 90% utilization with a 500 ms residency (e.g., phase residency) while executing one or more AVX instructions based on the telemetry data 122.

In some examples, the workload classifier 340 classifies a workload of the computing system 102 based on the telemetry parameters using an ML model, such as the ML model(s) 124 of FIG. 1 and/or the ML model(s) 228 of FIG. 2. In some examples, the workload classifier 340 assigns a workload label to each workload presently performed or scheduled to be performed by one or more resources of the computing system 102. For example, the workload classifier 340 may assign a label to a workload to generated and/or otherwise identify a labeled workload. In some examples, the workload classifier 340 may generate the workload label as a function of an executable name of the workload, a hash of all or a portion of the code (e.g., machine readable code) of the workload, or based on any other technique to uniquely identify each workload. For example, the workload classifier 340 may generate the workload label corresponding to the workload type based on the executable name, the hash(es), etc.

In some examples, the workload classifier 340 classifies and/or otherwise categorizes a workload (e.g., an unlabeled workload, a labeled workload), etc., based on the resource utilization associated with the workload. For example, the workload classifier 340 may classify the workload based on an identification of a fingerprint of the workload. In some examples, the workload classifier 340 may determine phase residency data from the telemetry data 122, which may be indicative of the time periods of various resource utilization phases exhibited by each workload and the patterns in which the workloads exhibit the resource utilization phases. In some examples, the phase residency data for a given workload may act as a fingerprint (e.g., a resource utilization pattern) unique to the workload. For example, the workload classifier 340 may generate a workload classification for a workload, which may be implemented as any data indicative of the general resource utilization tendencies of the workload. In some examples, the workload classifier 340 may generate and assign a workload classification for a workload to be processor intensive, memory intensive, interface or network bandwidth intensive, cache memory intensive, storage intensive, accelerator intensive, etc., and/or a combination thereof.

In some examples, the workload classifier 340 implements example means for classifying a workload based on one or more telemetry parameters, where the classification of the workload may be based on an output of a machine-learning model. For example, the means for classifying the workload may be implemented by executable instructions such as that implemented by at least block 808 of FIG. 8. In some examples, the workload classifier 340 implements example means for means for assigning, means for generating, etc., a label corresponding to a workload type and/or example means for assigning, means for generating, etc., a classification corresponding to the workload type. For example, the means for assigning, the means for generating, etc., a label corresponding to a workload type may be implemented by executable instructions such as that implemented by at least block 908 of FIG. 9. For example, the means for assigning, the means for generating, etc., a classification corresponding to the workload type may be implemented by executable instructions such as that implemented by at least block 910 of FIG. 9. In some examples, the executable instructions of block 808 of FIG. 8, block 908 of FIG. 9, and/or block 910 of FIG. 9 may be executed on at least one processor such as the example processor 1312 of FIG. 13. In other examples, the means for classifying a workload, the means for assigning a label, the means for generating a label, the means for assigning a classification, the means for generating a classification, etc., is/are implemented by hardware logic, hardware implemented state machines, logic circuitry, and/or any other combination of hardware, software, and/or firmware. For example, the means for classifying a workload, the means for assigning a label, the means for generating a label, the means for assigning a classification, the means for generating a classification, etc., may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 3, the guard band controller 300 includes the workload phase identifier 350 to identify a phase of a workload using an ML model, such as the ML model(s) 124 of FIG. 1 and/or the ML model(s) 228 of FIG. 2. In some examples, the workload phase identifier 350 determines historical resource utilization phases and residences corresponding to a workload type. For example, the workload phase identifier 350 may determine a residency based on phase residency data, which may be implemented as any data indicative of the time periods and patterns of resource utilization phases of a workload. For example, the workload phase identifier 350 may determine the resource utilization phases as time periods in which a workload uses at least a threshold amount of capacity or utilization (e.g., 70%, 80%, 90%, etc.) of a component (e.g., processor, memory, communication or interface circuitry, etc.) of a computing system, such as the computing system 102. In some examples, the phase residency data may be structured as a matrix in which each phase residency occupies a block of time associated with a resource of the computing system 102.

In some examples, the workload phase identifier 350 determines probabilities of future resource utilization phases. For example, the workload phase identifier 350 may analyze at least one of the telemetry data 122, the workload classifications, or the phase residency data to predict future resource utilization needs of the various workloads based on their previous usage and potential resource contention among the workloads. In some examples, the workload phase identifier 350 may utilize the phase residency data (e.g., periods of high processor usage and low memory usage, periods of low processor usage and high memory usage, etc.) of the workloads, determine a present resource utilization phase of a given workload, predict the next resource utilization phase based on the patterns in the phase residency data, and determine an amount of remaining time until the workload transitions to the next resource utilization phase indicated in the phase residency data.

In some examples, the workload phase identifier 350 executes the ML model(s) 124 with at least one of the telemetry data 122, the workload classifications, or the phase residency data as input(s) to generate outputs that may include one or more probabilities that a resource is currently in a first phase of a workload and/or one or more probabilities that the resource is to transition to another phase of the workload. For example, the ML model(s) 124 may output a first probability that the resource is to transition to a second phase, a second probability that the resource is to transition to a third phase, etc. In some examples, the workload phase identifier 350 may determine that the resource is to transition to the second phase based on the first probability being greater than the second probability.

In some examples, the workload phase identifier 350 determines one or more utilization phases of a type of a workload based on utilization data. For example, the workload phase identifier 350 may determine one or more compute utilization phases of a workload type based on compute utilization data associated with the CPU 106 of FIG. 1, which the compute utilization data may be included in the telemetry data 122. In some examples, the workload phase identifier 350 may determine one or more storage utilization phases of the workload type or a different workload type based on storage utilization data associated with the datastore 120 of FIG. 1, which the storage utilization data may be included in the telemetry data 122. In some examples, the workload phase identifier 350 may determine one or more cache utilization phases of the workload type or a different workload type based on cache utilization data associated with cache memory of the computing system 102 of FIG. 1, which the cache utilization data may be included in the telemetry data 122. In some examples, the workload phase identifier 350 may determine one or more memory utilization phases (e.g., non-volatile memory utilization phases, volatile memory utilization phases, etc.) of the workload type or a different workload type based on memory utilization data (e.g., non-volatile memory data, volatile memory data, etc.) associated with memory (e.g., non-volatile memory, volatile memory, etc.) of the computing system 102 of FIG. 1, which the memory utilization data may be included in the telemetry data 122.

In some examples, the workload phase identifier 350 may determine one or more acceleration utilization phases of the workload type or a different workload type based on acceleration utilization data associated with the first acceleration resource 108 and/or the second acceleration resource 110 of FIG. 1, which the acceleration utilization data may be included in the telemetry data 122. In some examples, the workload phase identifier 350 may determine one or more interface utilization phases of the workload type or a different workload type based on interface utilization data associated with the interface resource 114 of FIG. 1, which the interface utilization data may be included in the telemetry data 122.

In some examples, the workload phase identifier 350 determines pattern(s) of the resource utilization phase(s) of the workload type. For example, the workload phase identifier 350 may determine a resource utilization pattern that is unique and/or otherwise corresponds to a type of workload. In some examples, the workload phase identifier 350 may determine a resource utilization pattern of the CPU 106 based on compute utilization data associated with a type of workload executed by the CPU 106.

In some examples, the workload phase identifier 350 determines threshold(s) (e.g., a resource utilization threshold) to identify the utilization phase(s) of the workload type based on the pattern(s). For example, the workload phase identifier 350 may determine a compute utilization threshold of 80% based on the compute utilization pattern of the CPU 106 and/or an acceleration utilization threshold of 90% based on the acceleration utilization pattern of the first acceleration resource 108 when executing a first workload type, such as executing one or more Vector ISA instructions, to be indicative that the CPU 106 and/or the first acceleration resource 108 is/are operating in a first phase of the first workload type. In some examples, the workload phase identifier 350 may determine a compute utilization threshold of 20% based on the compute utilization pattern of the CPU 106 and/or an acceleration utilization threshold of 30% based on the acceleration utilization pattern of the first acceleration resource 108 when executing the first workload type, such as executing one or more Vector ISA instructions, to be indicative that the CPU 106 and/or the first acceleration resource 108 is/are operating in a second phase of the first workload type, which may be after the first phase. Additionally or alternatively, the workload phase identifier 350 may determine any other threshold for the computing system 102, such as a storage utilization threshold, a cache utilization threshold, a memory utilization threshold, an interface utilization threshold, etc., and/or a combination thereof, for one or more phases of a plurality of workload types based on the resource utilization pattern(s) for the corresponding resource(s).

In some examples, the workload phase identifier 350 implements example means for identifying a phase of a workload based on an output from a machine-learning model, where the phase may be based on a utilization of one or more hardware resources. In some examples, the workload phase identifier 350 implements example means for identifying a plurality of resource utilization phases corresponding to a workload type, where the plurality of the resource utilization phases may include a first phase and a second phase. In some examples, the workload phase identifier 350 implements example means for identifying a probability corresponding to an association of the first phase and the second phase. In some examples, the means for identifying is to identify one or more resource utilization phases corresponding to a type of the workload, where the one or more resource utilization phases include the first phase. In some examples, the means for identifying is to determine one or more patterns of the one or more resource utilization phases, where the one or more patterns may be based on a residency of the resource at the one or more resource utilization phases. In some examples, the means for identifying is to generate a resource utilization threshold based on the one or more patterns, the phase to be identified in response to the utilization satisfying the resource utilization threshold. For example, the means for identifying may be implemented by executable instructions such as that implemented by at least block 810 of FIG. 8, blocks 906 and/or 912 of FIG. 9, and/or one(s) of blocks 1102, 1104, 1106, 1108, 1110, 1112, 1114, 1116, and/or 1118 of FIG. 11. In some examples, the executable instructions of block 810 of FIG. 8, blocks 906 and/or 912 of FIG. 9, and/or one(s) of blocks 1102, 1104, 1106, 1108, 1110, 1112, 1114, 1116, and/or 1118 of FIG. 11 may be executed on at least one processor such as the example processor 1312 of FIG. 13. In other examples, the means for identifying is implemented by hardware logic, hardware implemented state machines, logic circuitry, and/or any other combination of hardware, software, and/or firmware. For example, the means for identifying may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 3, the guard band controller 300 includes the guard band determiner 360 to determine a guard band for a resource of a computing system, such as the computing system 102 of FIG. 1, based on a phase of a workload using a ML model, such as the ML model(s) 124 of FIG. 1 and/or the ML model(s) 228 of FIG. 2. For example, the guard band determiner 360 may execute the ML model(s) 228 using at least one of the voltage droop data 220 or the performance counter data 222 as inputs to determine a value of the voltage guard band 230 of FIG. 2. In some examples, the guard band determiner 360 executes the ML model(s) 228 to determine one or more probabilities associated with one or more future or upcoming resource utilization phases. For example, the guard band determiner 360 may determine a value of the voltage guard band 230 that corresponds to the most likely upcoming phase of a workload, which may be identified by the highest one of the one or more probabilities output by the ML model(s) 228.

In some examples, the guard band determiner 360 determines whether to adjust a guard band for a resource based on the determined guard band. For example, the guard band determiner 360 may compare a first value of the voltage guard band 230 determined by the ML model(s) 228 to a second value of the voltage guard band 230 implemented by the voltage regulator 216 of FIG. 2. In some examples, the guard band determiner 360 may determine to adjust the second value of the voltage guard band 230 to the first value of the voltage guard band 230 based on the comparison. For example, the guard band determiner 360 may determine to adjust the second value in response to a difference between the first value and the second value being greater than a threshold. In some examples, the guard band determiner 360 may determine not to adjust the second value in response to the difference between the first value and the second value being less than the threshold and/or in response to the first value being the same as the second value.

In some examples, the guard band determiner 360 instructs a power management unit to adjust a guard band for the resource to improve resource energy efficiency. For example, the guard band determiner 360 may provide the voltage guard band 230 to the power management unit 232. In some examples, the power management unit 232 may output the VID 234 based on the voltage guard band 230 to invoke and/or otherwise command the voltage regulator 216 to operate based on the voltage guard band 230 determined by the ML model(s) 228, which may be lower than a value of the voltage guard band 230 currently implemented by the voltage regulator 216. Advantageously, the guard band determiner 360 may decrease the power consumption by the processor core 204 by lowering the voltage guard band to the value determined by the ML model(s) 228. In some examples, the guard band determiner 360 may cause the processor core 204 to operate with increased performance by using the power previously consumed by the voltage guard band 230 to do an increased number of workloads compared to conventional implementations.

In some examples, the guard band determiner 360 implements example means for controlling, means for determining, etc., a guard band of a first hardware resource of one or more hardware resources based on a phase. In some examples, the means for controlling, the means for determining is to determine the guard band based on a probability. For example, the means for controlling, the means for determining, etc., a guard band may be implemented by executable instructions such as that implemented by at least blocks 812, 814, 816 of FIG. 8 and/or block 914 of FIG. 9. In some examples, the executable instructions of blocks 812, 814, 816 of FIG. 8 and/or block 914 of FIG. 9 may be executed on at least one processor such as the example processor 1312 of FIG. 13. In other examples, the means for controlling, the means for determining, etc., is implemented by hardware logic, hardware implemented state machines, logic circuitry, and/or any other combination of hardware, software, and/or firmware. For example, the means for controlling, the means for determining, etc., may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 3, the guard band controller 300 includes the datastore 370 to record data, which may include the training data 372, the ML model(s) 374, the telemetry data 376, and the phase-guard band relationship(s) 378. The datastore 370 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 370 may additionally or alternatively be implemented by one or more double data rate (DDR) memories, such as DDR, DDR2, DDR3, DDR4, mobile DDR (mDDR), etc. The datastore 370 may additionally or alternatively be implemented by one or more mass storage devices such as hard disk drive(s), CD drive(s), DVD drive(s), solid-state disk drive(s), etc. While in the illustrated example the datastore 370 is illustrated as a single datastore, the datastore 370 may be implemented by any number and/or type(s) of datastores. Furthermore, the data stored in the datastore 370 may be in any data format such as, for example, binary data, comma delimited data, tab delimited data, SQL structures, etc.

In some examples, the training data 372 may be implemented by any data that may be used to train an AI/ML model, such as the ML model(s) 374. In some examples, the training data 372 may originate from locally generated data, such as the telemetry data 376 from the computing system 102. In some examples where supervised training is used, the training data 372 may be labeled. In some examples, the training data 372 is pre-processed using, for example, an interface (e.g., a telemetry interface) to determine one or more telemetry parameters based on the telemetry data 376. In some examples, the training data 376 is sub-divided into a first portion of data for training the ML model(s) 374, and a second portion of data for validating the ML model(s) 374.

In some examples, the ML model(s) 374 include one or more untrained AI/ML models and/or one or more trained AI/ML models. For example, the ML model(s) 374 may include one or more untrained neural networks, one or more trained neural networks that are trained based on the training data 372, etc. In some examples, the ML model(s) 374 may implement the ML model(s) 124 of FIG. 1 and/or the ML model(s) 228 of FIG. 2.

In some examples, the telemetry data 376 includes utilization data associated with one or more hardware resources of the computing system 102, such as the CPU 106, the first acceleration resource 108, etc. In some examples, the telemetry data 376 implements the telemetry data 122 of FIG. 1. In some examples, the telemetry data 376 may include one or more telemetry parameters such as a resource utilization, a phase residency, etc., associated with a hardware resource of the computing system 102.

In some examples, the phase-guard band relationship(s) 378 implements the voltage guard band 230 of FIG. 2 and/or the guard band datastore 240 of FIG. 2 or portion(s) thereof. For example, the phase-guard band relationship(s) 378 may include one or more relationships that associate and/or otherwise link a workload phase with a corresponding guard band (e.g., a voltage guard band). In some examples, the phase-guard band relationship(s) 378 may include a first relationship that indicates an association of a first phase of a first workload with a first value of the voltage guard band 230, a second relationship that indicates an association of a second phase of the first workload with a second value of the voltage guard band 230, a third relationship that indicates an association of a first phase of a second workload with a third value of the voltage guard band 230, etc. For example, the guard band determiner 360 may map an identified phase of a workload to a value of the voltage guard band 230 based on a relationship included in the phase-guard band relationship(s) 378.

While an example manner of implementing the guard band controller 104A-F of FIG. 1 and/or the guard band controller 202 of FIG. 2 is/are illustrated in FIG. 3, one or more of the elements, processes and/or devices illustrated in FIG. 3 may be combined, divided, re-arranged, omitted, eliminated and/or implemented in any other way. Further, the example communication interface 310, the example deployment controller 320, the example model training handler 330, the example workload classifier 340, the example workload phase identifier 350, the example guard band determiner 360, the example datastore 370, the example training data 372, the example machine learning model(s) 374, the example telemetry data 376, the example phase-guard band relationship(s) 378, the example bus 380, and/or, more generally, the example guard band controller 300 of FIG. 3 may be implemented by hardware, software, firmware and/or any combination of hardware, software and/or firmware. Thus, for example, any of the example communication interface 310, the example deployment controller 320, the example model training handler 330, the example workload classifier 340, the example workload phase identifier 350, the example guard band determiner 360, the example datastore 370, the example training data 372, the example machine learning model(s) 374, the example telemetry data 376, the example phase-guard band relationship(s) 378, the example bus 380, and/or, more generally, the example guard band controller 300 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example communication interface 310, the example deployment controller 320, the example model training handler 330, the example workload classifier 340, the example workload phase identifier 350, the example guard band determiner 360, the example datastore 370, the example training data 372, the example machine learning model(s) 374, the example telemetry data 376, the example phase-guard band relationship(s) 378, and/or the example bus 380 is/are hereby expressly defined to include a non-transitory computer readable storage device or storage disk such as a memory, a DVD, a CD, a Blu-ray disk, etc. including the software and/or firmware. Further still, the example guard band controller 104A-F of FIG. 1 and/or the guard band controller 202 of FIG. 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
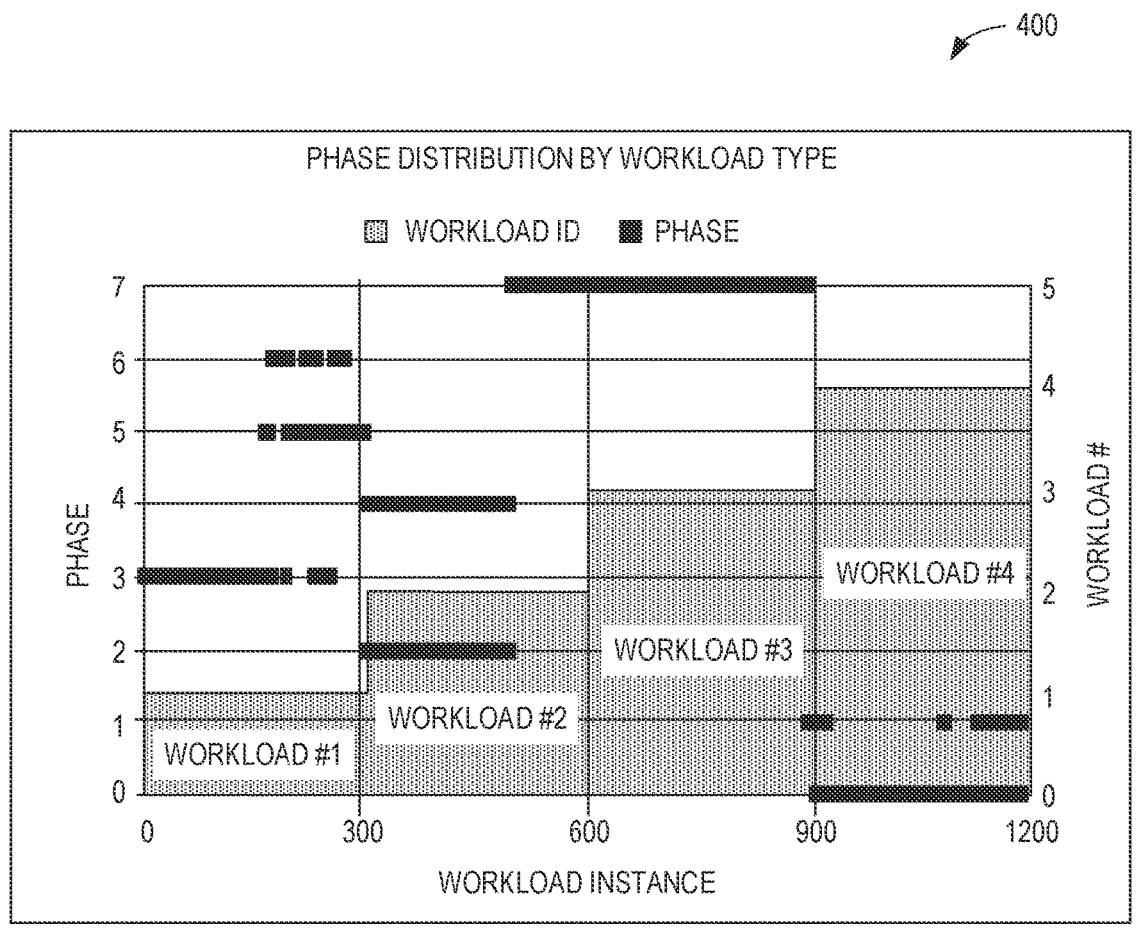
FIG. 4 depicts a graph of example workload phase distribution by workload type.

FIG. 4 depicts a graph 400 of example workload phase distribution by workload type. The graph 400 depicts phase as a function of and/or otherwise with respect to workload instances. The graph 400 of the illustrated example of FIG. 4 depicts example workload-phase boundaries for a hardware resource, such as the CPU 106 of FIG. 1, the first acceleration resource 108 of FIG. 1, etc. For example, the graph 400 may depict phase residencies with respect to identifiers of workloads executed by the CPU 106. In some examples, one or more of the resources of the computing system 102 may have a respective one of the graph 400. For example, the CPU 106 may have an implementation of the graph 400 based on compute utilization data of the CPU 106, the first acceleration resource 108 may have another implementation of the graph 400 based on acceleration utilization data of the first acceleration resource 108, etc. In some examples, the graph 400 or portion(s) thereof may implement the phase-guard band relationship(s) 378 of FIG. 3.

In the illustrated example of FIG. 4, each workload may be characterized by a unique composition of workload phases. For example, the workload phases may implement a fingerprint (e.g., a workload fingerprint, a fingerprint of a workload, etc.). In some examples, in response to the workload classifier 340 of FIG. 3 identifying the workload, the workload phase identifier 350 of FIG. 3 may identify the phase based on the resource utilization and its time-series pattern.

In the illustrated example of FIG. 4, workload-1 is a complex mix of phases 3, 5, and 6. In the graph 400, workload-2 is a mix of phases 2 and 4. In the graph 400, workload-3 is composed mainly of phase 7 while workload-4 is a combination of phases 0 and 1. Advantageously, the phases depicted in the graph 400 of the example of FIG. 4 discover the unique characteristic that may be specific to a workload instance at any time.

FIG. 5 depicts a graph 500 of example power savings of the example computing system 102 of FIG. 1 that may be achieved by the example guard band controller 104A-F, 202, 300 of FIGS. 1, 2, and/or 3. In the graph 500 of FIG. 5, examples of projected gains are depicted that may be achieved for cores of a processor, such as the processor core 204 of FIG. 2, in terms of power consumption savings. In this example, a reduction of 30 millivolts (mV) in a guard band of a resource may result in power consumption savings of 2.6% when executing a workload such as browsing. In this example, a reduction of 50 mV in a guard band (e.g., the voltage guard band 230 of FIG. 2) of a resource may result in power consumption savings of 3.1% when executing a workload such as capturing photos at a frame rate of 2 frames per second (fps). In this example, a reduction of 100 mV in a guard band of a resource may result in power consumption savings of 4.2% when executing a workload related to productivity applications (e.g., a word processor application, a spreadsheet processor application, etc.). Advantageously, the guard band controller 104A-F, 202, 300 of FIGS. 1, 2, and/or 3 may achieve power savings as depicted in the graph 500 of the illustrated example of FIG. 5 by dynamically reducing a voltage guard band based on a workload of a hardware resource of a computing system, such as the computing system 102 of FIG. 1.

FIG. 6 depicts a graph 600 of example improved performance of the example computing system 102 of FIG. 1 that may be achieved by the example guard band controller 104A-F, 202, 300 of FIGS. 1, 2, and/or 3. The graph 600 of FIG. 6 depicts top or peak power in Watts (W) of a compute core, such as the processor core 204 of FIG. 2, with respect to frequency in gigahertz (GHz).

The graph 600 of the illustrated example of FIG. 6 includes a first example performance line 602, a second example performance line 604, and a third example performance line 606. In this example, the first performance line 602 represents core top power with respect to frequency for a core implemented by 10 nanometer (nm) semiconductor technology without guard band reduction. In this example, the second performance line 604 represents core top power with respect to frequency for a core implemented by 10 nm semiconductor technology based on a 50 mV reduction in guard band. In this example, the third performance line 606 represents core top power with respect to frequency for a core implemented by 10 nm semiconductor technology based on a 100 mV reduction in guard band.

Advantageously, the guard band controller 104A-F, 202, 300 of FIGS. 1, 2, and/or 3 may improve performance of a resource, such as the CPU 106, the processor core 204, etc., by increasing an operating frequency of the resource based on the reduction in voltage guard band. For example, the processor core 204 may operate at 2.1 GHz. In the graph 600 of FIG. 6, the power consumed by the processor core 204 to operate at 2.1 GHz at no guard band reduction is the same as the power consumed by the processor core 204 operating at 2.5 GHz with a 100 mV guard band reduction. Advantageously, the processor core 204 may operate with improved performance (e.g., from 2.1 GHz to 2.5 GHz) in response to reducing the guard band by 100 mV based on a workload to be executed by the processor core 204.

FIG. 7 depicts a table 700 of example improvements in a binning process of example hardware resources that may be achieved in response to example guard band reductions effectuated by the example guard band controller 104A-F, 202, 300 of FIGS. 1, 2, and/or 3. For example, a plurality of the same hardware resources (e.g., a plurality of instances of the CPU 106, the first acceleration resource 108, etc.) may be processed during manufacturing with a binning process.

In the illustrated example of FIG. 7, 52% of hardware resources, such as a plurality of the CPU 106, may be identified as capable of operating at 2.8 GHz without violating a thermal design profile (TDP) of the hardware resource based on no guard band (GB) reduction. In this example, 98% of hardware resources, such as the plurality of the CPU 106, may be identified as capable of operating at 2.8 GHz without violating the TDP of the hardware resource based on a 100 mV guard band reduction. Advantageously, a greater number of the same hardware resources may be identified during a manufacturing binning process that can operate with higher performance by utilizing dynamic guard band reductions effectuated by the example guard band controller 104A-F, 202, 300 of FIGS. 1, 2, and/or 3.

Flowcharts representative of example hardware logic, machine readable instructions, hardware implemented state machines, and/or any combination thereof for implementing the example guard band controller 104A-F of FIG. 1, the example guard band controller 202 of FIG. 2, and/or the example guard band controller 300 of FIG. 3 are shown in FIGS. 8-12. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 8-12, many other methods of implementing the example guard band controller 104A-F of FIG. 1, the example guard band controller 202 of FIG. 2, and/or the example guard band controller 300 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
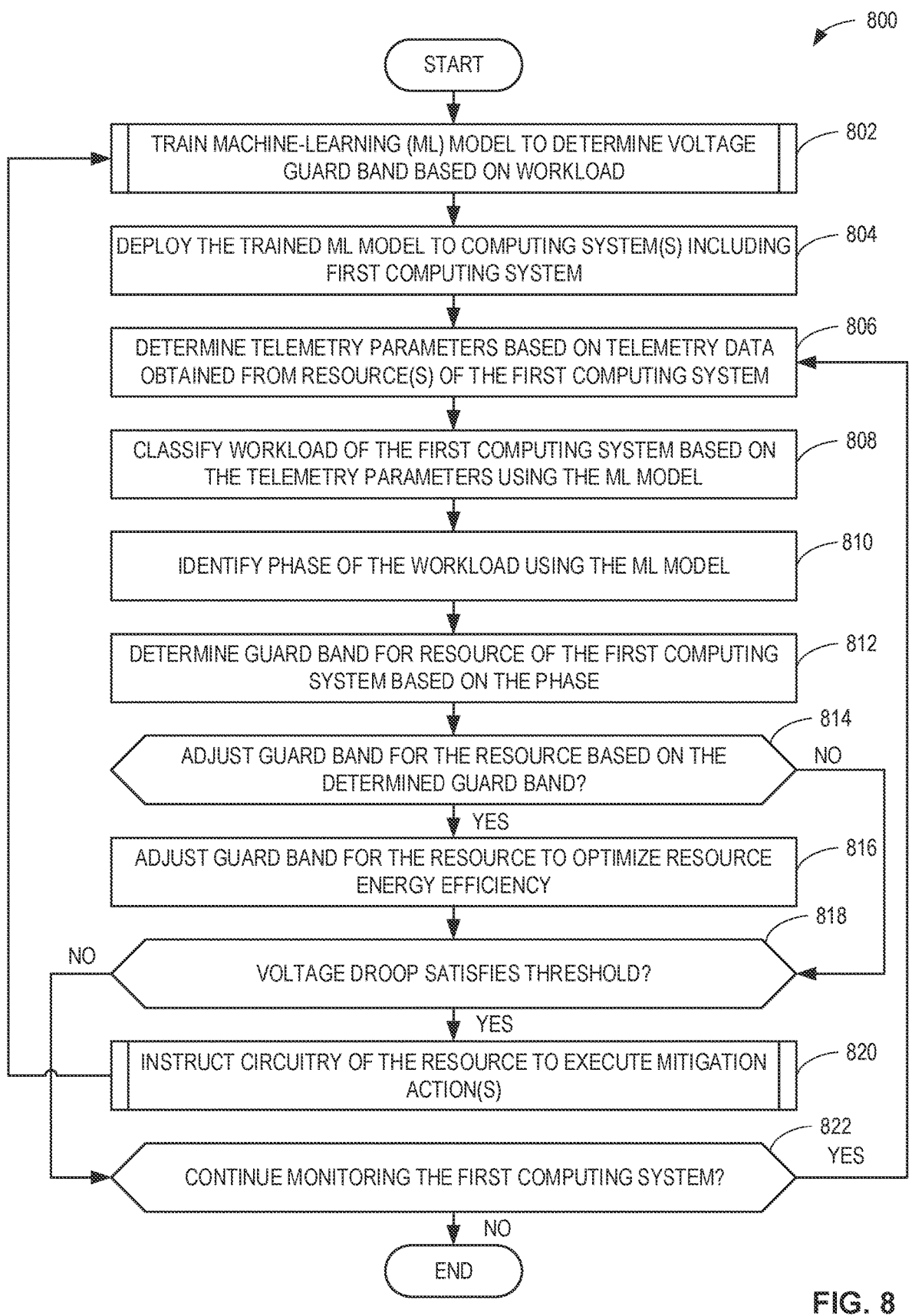
FIG. 8 is a flowchart representative of example machine readable instructions that may be executed to implement the example guard band controller of FIGS. 1, 2, and/or 3 to adjust a guard band of an example hardware resource of the example computing system of FIG. 1 based on a workload of the hardware resource.

FIG. 8 is a flowchart representative of example machine readable instructions 800 that may be executed to implement the example guard band controller 104A-F, 202, 300 of FIGS. 1, 2, and/or 3 to adjust a guard band of an example hardware resource of the example computing system 102 of FIG. 1 based on a workload of the hardware resource. The machine readable instructions 800 of FIG. 8 begin at block 802, at which the guard band controller 104A-F, 202, 300 trains a machine-learning (ML) model to determine a voltage guard band based on a workload. For example, the model training handler 330 (FIG. 3) may train the ML model(s) 374 (FIG. 3) to determine a value of the voltage guard band 230 (FIG. 2) based on a workload of the processor core 204 or other hardware resource, such as the first acceleration resource 108 of FIG. 1. An example process that may be executed to implement block 802 is described below in connection with FIG. 9.

At block 804, the guard band controller 104A-F, 202, 300 deploys the trained ML model to computing system(s) including a first computing system. For example, the deployment controller 320 (FIG. 3) may deploy the ML model(s) 374 to one(s) of the external computing systems 130 and/or the computing system 102 of FIG. 1.

At block 806, the guard band controller 104A-F, 202, 300 determines telemetry parameters based on telemetry data obtained from resource(s) of the first computing system. For example, the workload classifier 340 (FIG. 3) may determine one or more telemetry parameters including utilization data, phase residency data, etc., based on the telemetry data 122 of FIG. 1 obtained from one or more hardware resources of the computing system 102.

At block 808, the guard band controller 104A-F, 202, 300 classifies a workload of the first computing system based on the telemetry parameters using the ML model. For example, the workload classifier 340 may classify a workload currently being executed or to be executed by a resource, such as the CPU 106 of FIG. 1, based on the telemetry data 122 by utilizing the ML model(s) 374. In some examples, the workload classifier 340 may classify the workload as processor intensive, memory intensive, interface or network bandwidth intensive, cache memory intensive, storage intensive, accelerator intensive, etc., and/or a combination thereof based on the telemetry data 122 associated with the workload.

At block 810, the guard band controller 104A-F, 202, 300 identifies a phase of the workload using the ML model. For example, the workload phase identifier 350 (FIG. 3) may execute the ML model(s) 374 to identify a phase of the workload. In some examples, the workload phase identifier 350 may identify the phase in response to determining a fingerprint of the workload, the phase of the workload, etc.

At block 812, the guard band controller 104A-F, 202, 300 determines a guard band for a resource of the first computing system based on the phase. For example, the guard band determiner 360 (FIG. 3) may identify a value of the voltage guard band 230 (FIG. 2) that corresponds to the phase. In some examples, the guard band determiner 360 may identify the value by mapping the phase to the phase-guard band relationship(s) 378 (FIG. 3).

At block 814, the guard band controller 104A-F, 202, 300 determines whether to adjust a guard band for the resource based on the determined guard band. For example, the guard band determiner 360 may determine to increase or decrease the guard band of the processor core 204 based on the phase of the workload, a predicted upcoming phase of the workload, etc. In other examples, the guard band determiner 360 may determine not to increase or decrease the guard band of the processor core 204 because the guard band is optimized and/or otherwise aligns with the phase of the workload, the predicted upcoming phase of the workload, etc.

If, at block 814, the guard band controller 104A-F, 202, 300 determines not to adjust the guard band for the resource based on the determined guard band, control proceeds to block 818 to determine whether a voltage droop satisfies a threshold. If, at block 814, the guard band controller 104A-F, 202, 300 determines to adjust the guard band for the resource based on the determined guard band, then, at block 816, the guard band controller 104A-F, 202, 300 adjusts a guard band for the resource to optimize resource energy efficiency. For example, the guard band determiner 360 may provide the voltage guard band 230 to the power management unit 232 (FIG. 2), which may instruct the voltage regulator 216 (FIG. 2) to decrease the guard band of the processor core 204 to improve and power efficiency of the processor core 204, improve performance of the processor core based on achieved power savings due to the decreased guard band, etc.

In response to adjusting the guard band for the resource to optimize resource energy efficiency at block 816, the guard band controller 104A-F, 202, 300 determines whether a voltage droop satisfies a threshold at block 818. For example, the workload classifier 340 may determine a voltage droop of the processor core 204 based on the voltage droop data 220 (FIG. 2) and may determine whether the voltage droop satisfies one or more thresholds. In some examples, the droop monitor circuitry 206 (FIG. 2) may determine a voltage droop of the processor core 204 based on measurement(s) of the voltage 214 (FIG. 2). In some examples, the droop monitor circuitry 206 may provide the voltage droop to the voltage droop processing circuitry 208, which may provide the voltage droop data 220 based on the voltage droop to the guard band controller 202. In some examples, the droop monitor circuitry 206 may determine that the voltage droop is greater than one or more thresholds and, thus, satisfies the respective one(s) of the one or more thresholds.

If, at block 818, the guard band controller 104A-F, 202, 300 determines that the voltage droop satisfies the threshold, then, at block 820, the guard band controller 104A-F, 202, 300 instructs circuitry of the resource to execute mitigation action(s). In some examples, the droop monitor circuitry 206 and/or, more generally, the processor core 204, may instruct the instruction throttling circuitry 210 (FIG. 2), the clock control circuitry 212 (FIG. 2), etc., to execute one or more mitigation actions such as clock gating (e.g., fine-grained clock gating), instruction throttling, etc., and/or a combination thereof. In response to instructing the circuitry of the resource to execute the mitigation action(s), control returns to block 802 to re-train the ML model to determine the voltage guard band based on the workload. An example process that may be executed to implement block 820 is described below in connection with FIG. 12.

If, at block 818, the guard band controller 104A-F, 202, 300 determines that the voltage droop does not satisfy the threshold, control proceeds to block 822 to determine whether to continue monitoring the first computing system. For example, the communication interface 310 (FIG. 3) may determine that there is additional telemetry data 122 to obtain and process. In some examples, the communication interface 310 may determine that a resource of interest of the computing system 102 is to execute another workload based on output(s) from a hardware scheduler, a software scheduler, an OS scheduler, etc., of the computing system 102. If, at block 822, the guard band controller 104A-F, 202, 300 determines to continue monitoring the first computing system, control returns to block 806 to determine telemetry parameters based on the telemetry data obtained from the resource(s) of the first computing system, otherwise the machine readable instructions 800 of FIG. 8 conclude.

Figure 9:
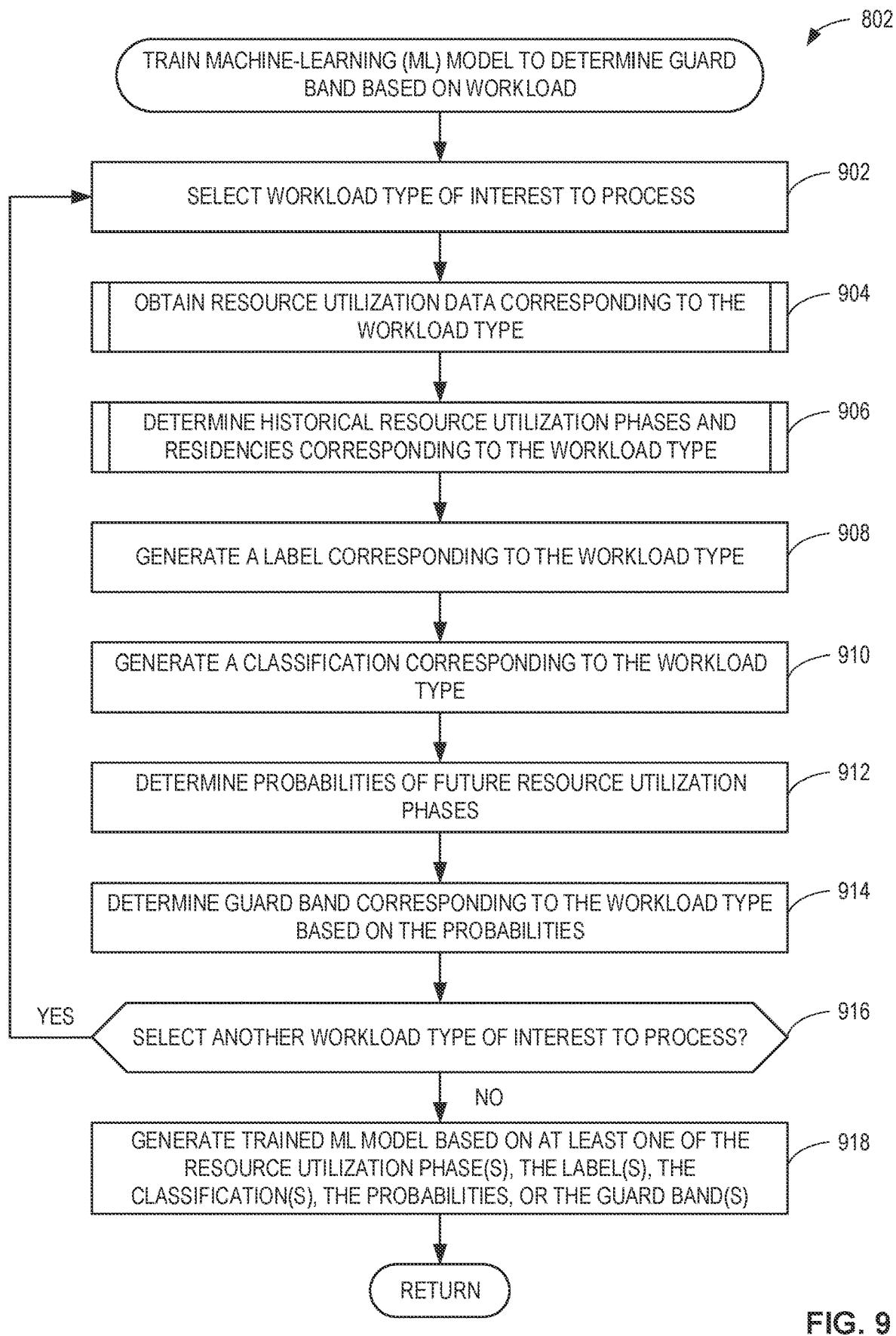
FIG. 9 is a flowchart representative of example machine readable instructions that may be executed to implement the example guard band controller of FIGS. 1, 2, and/or 3 to train an example machine-learning model to determine a guard band based on a workload.

FIG. 9 is a flowchart representative of example machine readable instructions that may be executed to implement block 802 of the machine readable instructions 800 of FIG. 8. For example, the machine readable instructions 802 of FIG. 9 may be executed to implement the example guard band controller 104A-F, 202, 300 of FIGS. 1, 2, and/or 3 to train an example machine-learning model to determine a guard band based on a workload. The machine readable instructions 802 of FIG. 9 begin at block 902, at which the guard band controller 104A-F, 202, 300 selects a workload type of interest to process. For example, the model training handler 330 (FIG. 3) may select workload-1 of the graph 400 of FIG. 4 to process. In some examples, workload-1 may correspond to an execution of AI/ML task(s), computer modeling or simulation task(s), browsing task(s), entertainment task(s), etc.

At block 904, the guard band controller 104A-F, 202, 300 obtains resource utilization data corresponding to a workload type. For example, the communication interface 310 (FIG. 3) may obtain the telemetry data 122 (FIG. 1), which may include resource utilization data associated with one(s) of the resources of the computing system 102. An example process that may executed to implement block 904 is described below in connection with FIG. 10.

At block 906, the guard band controller 104A-F, 202, 300 determines historical resource utilization phases and residences corresponding to the workload type. For example, the workload phase identifier 350 (FIG. 3) may determine one or more historical resource utilization phases, such as phases 1-7 of the graph 400 of FIG. 4, that correspond to the workload type, such as workload-1 of the graph 400 of FIG. 4. An example process that may be executed to implement block 906 is described below in connection with FIG. 11.

At block 908, the guard band controller 104A-F, 202, 300 generates a label corresponding to the workload type. For example, the workload classifier 340 (FIG. 3) may generate a label for workload-1 as a function of an executable name of workload-1, a hash of all or a portion of the code (e.g., machine readable code) of workload-1, or based on any other technique to uniquely identify workload-1.

At block 910, the guard band controller 104A-F, 202, 300 generates a classification corresponding to the workload type. For example, the workload classifier 340 may generate a classification for workload-1 as processor intensive, memory intensive, interface or network bandwidth intensive, cache memory intensive, storage intensive, accelerator intensive, etc., and/or a combination thereof.

At block 912, the guard band controller 104A-F, 202, 300 determines probabilities of future resource utilization phases. For example, the workload phase identifier 350 (FIG. 3) may determine one or more probabilities associated with transitioning from a first phase of a workload to a second phase of the workload. In some examples, the workload phase identifier 350 may determine a first probability that phase 3 of workload-1 of FIG. 4 transitions to phase 5, a second probability that phase 3 of workload-1 transitions to FIG. 6, etc.

At block 914, the guard band controller 104A-F, 202, 300 determines a guard band corresponding to the workload type based on the probabilities. For example, the guard band determiner 360 (FIG. 3) may determine one or more values of the voltage guard band 230 based on the probabilities. In some examples, the guard band determiner 360 may store associations between the phases and corresponding guard bands as the phase-guard band relationship(s) 378 (FIG. 3).

At block 916, the guard band controller 104A-F, 202, 300 determines whether to select another workload type of interest to process. For example, the model training handler 330 may select workload-2 (e.g., a plurality of instances of workload-2) of the graph 400 of FIG. 4 to process.

If, at block 916, the guard band controller 104A-F, 202, 300 determines to select another workload type of interest to process, control returns to block 902 to select another workload type of interest to process. If, at block 916, the guard band controller 104A-F, 202, 300 determines not to select another workload type of interest to process, then, at block 918, the guard band controller 104A-F, 202, 300 generates a trained ML model based on at least one of the resource utilization phase(s), the label(s), the classification(s), the probabilities, or the guard band(s). For example, the model training handler 330 may output and/or otherwise generate the ML model(s) 374 based on at least one of the resource utilization phases, the label, the classification, the probabilities, or the guard bands of workload-1, which some or all of such data may be included in the training data 372 (FIG. 3). In some examples, the model training handler 330 may store the trained ML model(s) 374 in the datastore 370 (FIG. 3) and/or distribute the trained ML model(s) 374 to one(s) of the external computing systems 130 of FIG. 1.

In response to generating the trained ML model at block 918, control may return to block 804 of the machine readable instructions 800 of FIG. 8 to deploy the trained ML model to computing system(s) including a first computing system. Additionally or alternatively, the machine readable instructions 802 of FIG. 9 may conclude in response to generating the trained ML model at block 918.

Figure 10:
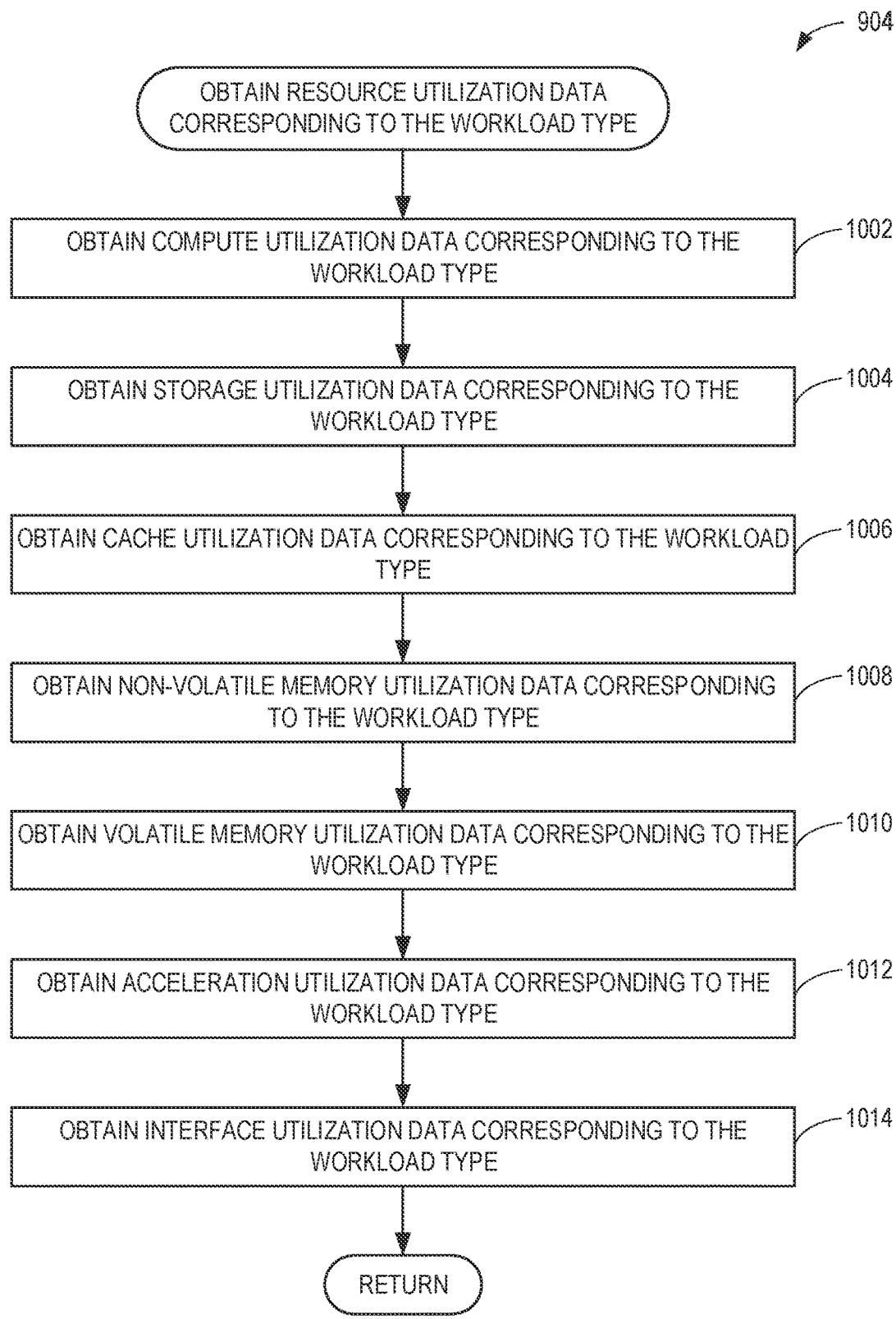
FIG. 10 is a flowchart representative of example machine readable instructions that may be executed to implement the example guard band controller of FIGS. 1, 2, and/or 3 to obtain example resource utilization data corresponding to a workload type.

FIG. 10 is a flowchart representative of example machine readable instructions that may be executed to implement block 904 of the machine readable instructions 802 of FIG. 9. For example, the machine readable instructions 904 of FIG. 9 may be executed to implement the example guard band controller 104A-F, 202, 300 of FIGS. 1, 2, and/or 3 to obtain example resource utilization data corresponding to a workload type. The machine readable instructions 904 of FIG. 10 begin at block 1002, at which the guard band controller 104A-F, 202, 300 obtains compute utilization data corresponding to a workload type. For example, the communication interface 310 (FIG. 3) may obtain the telemetry data 122 from the CPU 106 (FIG. 1), the processor core 204 (FIG. 2), one(s) of the external computing systems 130 (FIG. 1), etc., that is/are associated with a workload, such as workload-1, workload-2, workload-3, etc., of the graph 400 of FIG. 4. In some examples, the communication interface 310 may determine that the telemetry data 122 includes compute utilization data corresponding to utilization of the CPU 106, the processor core 204, compute resources associated with the one(s) of the external computing systems 130, etc., when executing the workload or different workload(s).

At block 1004, guard band controller 104A-F, 202, 300 obtains storage utilization data corresponding to the workload type. For example, the communication interface 310 may obtain the telemetry data 122 from the datastore 120 (FIG. 1), one(s) of the external computing systems 130, etc., that is/are associated with the workload, such as workload-1, workload-2, workload-3, etc., of the graph 400 of FIG. 4. In some examples, the communication interface 310 may determine that the telemetry data 122 includes storage utilization data corresponding to utilization of the datastore 120, datastore(s) associated with the one(s) of the external computing systems 130, etc., when executing the workload or different workload(s).

At block 1006, guard band controller 104A-F, 202, 300 obtains cache utilization data corresponding to the workload type. For example, the communication interface 310 may obtain the telemetry data 122 from the cache memory of the computing system 102, one(s) of the external computing systems 130, etc., that is/are associated with the workload, such as workload-1, workload-2, workload-3, etc., of the graph 400 of FIG. 4. In some examples, the communication interface 310 may determine that the telemetry data 122 includes cache utilization data corresponding to utilization of the cache memory, cache memory associated with the one(s) of the external computing systems 130, etc., when executing the workload or different workload(s).

At block 1008, guard band controller 104A-F, 202, 300 obtains non-volatile memory utilization data corresponding to the workload type. For example, the communication interface 310 may obtain the telemetry data 122 from the non-volatile memory of the computing system 102, one(s) of the external computing systems 130, etc., that is/are associated with the workload, such as workload-1, workload-2, workload-3, etc., of the graph 400 of FIG. 4. In some examples, the communication interface 310 may determine that the telemetry data 122 includes non-volatile memory utilization data corresponding to utilization of the non-volatile memory, non-volatile memory associated with the one(s) of the external computing systems 130, etc., when executing the workload or different workload(s).

At block 1010, guard band controller 104A-F, 202, 300 obtains volatile memory utilization data corresponding to the workload type. For example, the communication interface 310 may obtain the telemetry data 122 from the volatile memory of the computing system 102, one(s) of the external computing systems 130, etc., that is/are associated with the workload, such as workload-1, workload-2, workload-3, etc., of the graph 400 of FIG. 4. In some examples, the communication interface 310 may determine that the telemetry data 122 includes volatile memory utilization data corresponding to utilization of the volatile memory, volatile memory associated with the one(s) of the external computing systems 130, etc., when executing the workload or different workload(s).

At block 1012, guard band controller 104A-F, 202, 300 obtains acceleration utilization data corresponding to the workload type. For example, the communication interface 310 may obtain the telemetry data 122 from the first acceleration resource 108 (FIG. 1), the second acceleration resource 110 (FIG. 1), one(s) of the external computing systems 130, etc., that is/are associated with the workload, such as workload-1, workload-2, workload-3, etc., of the graph 400 of FIG. 4. In some examples, the communication interface 310 may determine that the telemetry data 122 includes acceleration utilization data corresponding to utilization of the first acceleration resource 108, the second acceleration resource 110, acceleration resource(s) associated with the one(s) of the external computing systems 130, etc., when executing the workload or different workload(s).

At block 1014, guard band controller 104A-F, 202, 300 obtains interface utilization data corresponding to the workload type. For example, the communication interface 310 may obtain the telemetry data 122 from the interface resource 114 (FIG. 1), one(s) of the external computing systems 130, etc., that is/are associated with the workload, such as workload-1, workload-2, workload-3, etc., of the graph 400 of FIG. 4. In some examples, the communication interface 310 may determine that the telemetry data 122 includes interface utilization data corresponding to utilization of the interface resource 114, interface resource(s) associated with the one(s) of the external computing systems 130, etc., when executing the workload or different workload(s). In response to obtaining the interface utilization data corresponding to the workload type at block 1014, control may return to block 906 of the machine readable instructions 802 of FIG. 9 to determine historical resource utilization phases and residencies corresponding to the workload type. Additionally or alternatively, the machine readable instructions 904 of FIG. 10 may conclude in response to obtaining the interface utilization data corresponding to the workload type at block 1014.

Figure 11:
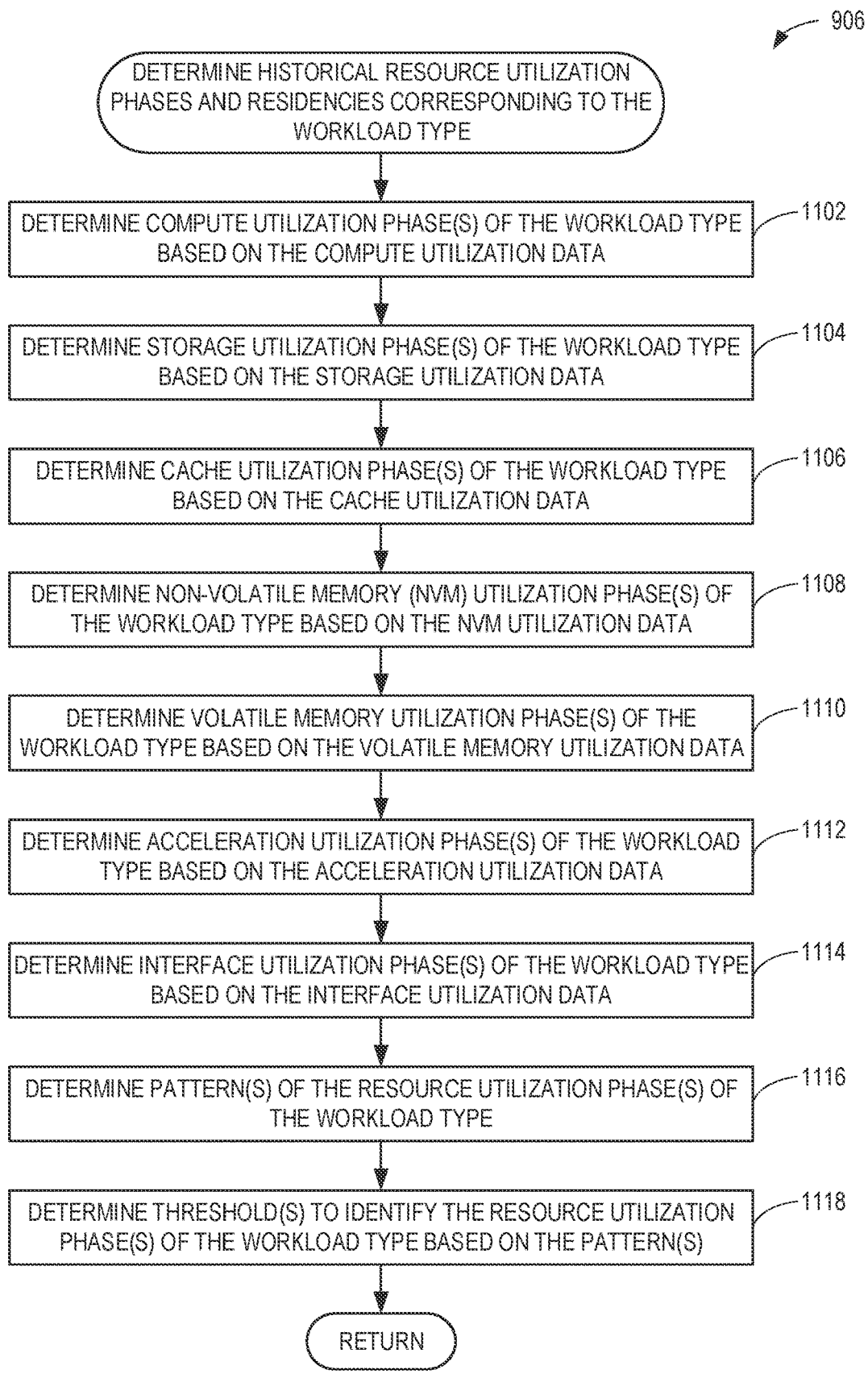
FIG. 11 is a flowchart representative of example machine readable instructions that may be executed to implement the example guard band controller of FIGS. 1, 2, and/or 3 to determine example historical resource utilization phases and residencies corresponding to a workload type.

FIG. 11 is a flowchart representative of example machine readable instructions that may be executed to implement block 906 of the machine readable instructions 802 of FIG. 9. For example, the machine readable instructions 906 of FIG. 11 may be executed to implement the example guard band controller 104A-F, 202, 300 of FIGS. 1, 2, and/or 3 to determine example historical resource utilization phases and residencies corresponding to a workload type. The machine readable instructions 906 of FIG. 9 begin at block 1102, at which the guard band controller 104A-F, 202, 300 determines compute utilization phase(s) of the workload type based on the compute utilization data. For example, the workload phase identifier 350 (FIG. 3) may determine one or more phases of workload-1, workload-2, workload-3, etc., of the graph 400 of FIG. 4 executed by the CPU 106 (FIG. 1), the processor core 204 (FIG. 2), and/or one(s) of the external computing systems 130 (FIG. 1) based on at least one of the compute utilization data or residencies at which the CPU 106, the processor core 204, and/or the one(s) of the external computing systems 130 operate in connection with the compute utilization data.

At block 1104, the guard band controller 104A-F, 202, 300 determines storage utilization phase(s) of the workload type based on the storage utilization data. For example, the workload phase identifier 350 may determine one or more phases of workload-1, workload-2, workload-3, etc., of the graph 400 of FIG. 4 executed by the datastore 120 (FIG. 1) and/or one(s) of the external computing systems 130 based on at least one of the storage utilization data or residencies at which the datastore 120 and/or the one(s) of the external computing systems 130 operate in association with the storage utilization data.

At block 1106, the guard band controller 104A-F, 202, 300 determines cache utilization phase(s) of the workload type based on the cache utilization data. For example, the workload phase identifier 350 may determine one or more phases of workload-1, workload-2, workload-3, etc., of the graph 400 of FIG. 4 executed by the cache memory of the computing system 102 and/or one(s) of the external computing systems 130 based on at least one of the cache utilization data or residencies at which the cache memory of the computing system 102 and/or the one(s) of the external computing systems 130 operate in association with the cache utilization data.

At block 1108, the guard band controller 104A-F, 202, 300 determines non-volatile memory (NVM) utilization phase(s) of the workload type based on the NVM utilization data. For example, the workload phase identifier 350 may determine one or more phases of workload-1, workload-2, workload-3, etc., of the graph 400 of FIG. 4 executed by the non-volatile memory of the computing system 102 and/or one(s) of the external computing systems 130 based on at least one of the non-volatile memory utilization data or residencies at which the non-volatile memory of the computing system 102 and/or the one(s) of the external computing systems 130 operate in association with the non-volatile memory utilization data.

At block 1110, the guard band controller 104A-F, 202, 300 determines volatile memory utilization phase(s) of the workload type based on the volatile memory utilization data. For example, the workload phase identifier 350 may determine one or more phases of workload-1, workload-2, workload-3, etc., of the graph 400 of FIG. 4 executed by the volatile memory of the computing system 102 and/or one(s) of the external computing systems 130 based on at least one of the volatile memory utilization data or residencies at which the volatile memory of the computing system 102 and/or the one(s) of the external computing systems 130 operate in association with the volatile memory utilization data.

At block 1112, the guard band controller 104A-F, 202, 300 determines acceleration utilization phase(s) of the workload type based on the acceleration utilization data. For example, the workload phase identifier 350 may determine one or more phases of workload-1, workload-2, workload-3, etc., of the graph 400 of FIG. 4 executed by the first acceleration resource 108, the second acceleration resource 110, and/or one(s) of the external computing systems 130 based on at least one of the acceleration utilization data or residencies at which the first acceleration resource 108, the second acceleration resource 110, and/or the one(s) of the external computing systems 130 operate in association with the acceleration utilization data.

At block 1114, the guard band controller 104A-F, 202, 300 determines interface utilization phase(s) of the workload type based on the interface utilization data. For example, the workload phase identifier 350 may determine one or more phases of workload-1, workload-2, workload-3, etc., of the graph 400 of FIG. 4 executed by the interface resource 114 (FIG. 1) and/or one(s) of the external computing systems 130 based on at least one of the interface utilization data or residencies at which the interface resource 114 and/or the one(s) of the external computing systems 130 operate in association with the interface utilization data.

At block 1116, the guard band controller 104A-F, 202, 300 determines pattern(s) of the resource utilization phase(s) of the workload type. For example, the workload phase identifier 350 may identify one or more resource utilization patterns of one or more resource utilization phases, such as the compute utilization phase(s), the storage utilization phase(s), etc. In some examples, the workload phase identifier 350 may determine a fingerprint of a workload based on the resource utilization pattern(s).

At block 1118, the guard band controller 104A-F, 202, 300 determines threshold(s) to identify the resource utilization phase(s) of the workload type based on the pattern(s). For example, the workload phase identifier 350 may determine a first threshold of 80% for compute utilization to identify phase 3 of workload-1 of the graph 400. In some examples, the workload phase identifier 350 may determine a second threshold of 85% for storage utilization to identify phase 2 of workload-2 of the graph 400.

In response to determining the threshold(s) to identify the resource utilization phase(s) of the workload type based on the pattern(s) at block 1118, control may return to block 908 of the machine readable instructions 802 of FIG. 9 to generate a label corresponding to the workload type. Additionally or alternatively, the machine readable instructions 906 of FIG. 11 may conclude in response to determining the threshold(s) to identify the resource utilization phase(s) of the workload type based on the pattern(s) at block 1118.

Figure 12:
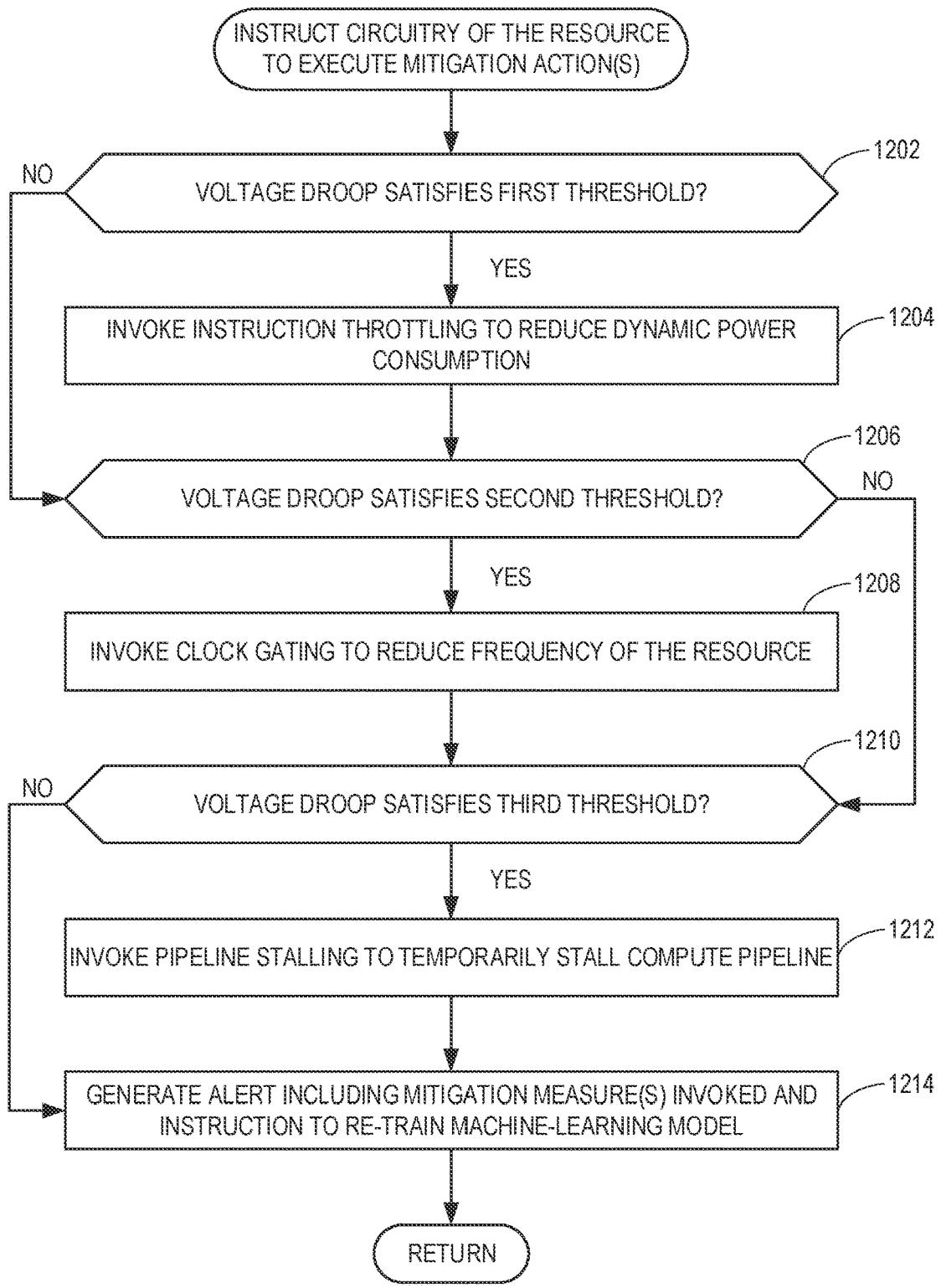
FIG. 12 is a flowchart representative of an example process that may be performed using example machine readable instructions that may be executed and/or example hardware configured to implement the example droop monitor circuitry of FIG. 2, and/or, more generally, the example processor core of FIG. 2, to execute mitigation action(s).

FIG. 12 is a flowchart representative of an example process that may implement block 820 of the machine readable instructions 800 of FIG. 8. For example, the process 820 of FIG. 12 may be performed using machine readable instructions that may be executed and/or hardware configured to implement the example droop monitor circuitry 206 of FIG. 2, and/or, more generally, the example processor core 204 of FIG. 2, to execute mitigation action(s).

The process 820 of FIG. 12 begins at block 1202, at which the processor core 204 determines whether a voltage droop satisfies a first threshold. For example, the droop monitor circuitry 206 may determine a voltage droop of the processor core 204 based on measurement(s) of the voltage 214 (FIG. 2). In some examples, the droop monitor circuitry 206 and/or, more generally, the processor core 204, determines whether the voltage droop is greater than one or more thresholds.

If, at block 1202, the processor core 204 determines that the voltage droop does not satisfy the first threshold, control proceeds to block 1206 to determine whether the voltage droop satisfies a second threshold. If, at block 1202, the processor core 204 determines that the voltage droop satisfies the first threshold, then, at block 1204, the processor core 204 invokes instruction throttling to reduce dynamic power consumption. For example, the droop monitor circuitry 206 and/or, more generally, the processor core 204, may instruct the instruction throttling circuitry 210 to execute instruction throttling to reduce dynamic power consumption. In response to invoking instruction throttling to reduce dynamic power consumption at block 1204, the processor core 204 determines whether the voltage droop satisfies the second threshold at block 1206.

If, at block 1206, the processor core 204 determines that the voltage droop does not satisfy the second threshold, control proceeds to block 1210 to determine whether the voltage droop satisfies a third threshold. If, at block 1206, the processor core 204 determines that the voltage droop satisfies the second threshold, then, at block 1208, the processor core 204 invokes clock gating to reduce a frequency of the resource. For example, the droop monitor circuitry 206, and/or, more generally, the processor core 204, may direct the clock control circuitry 212 to effectuate clock gating (e.g., fine-grained clock gating) to reduce a guaranteed operating frequency of the processor core 204. In response to invoking clock gating to reduce the frequency of the resource at block 1208, the processor core 204 determines whether the voltage droop satisfies the third threshold at block 1210.

If, at block 1210, the processor core 204 determines that the voltage droop does not satisfy the third threshold, control proceeds to block 1214 to generate an alert including mitigation measure(s) invoked and an instruction to re-train a machine-learning model. If, at block 1210, the processor core 204 determines that the voltage droop satisfies the third threshold, then, at block 1212, the processor core 204 invokes pipeline stalling to temporarily stall a compute pipeline. For example, the droop monitor circuitry 206, and/or, more generally, the processor core 204, may insert one or more no-op instructions in data to be executed by one or more execution units of the processor core 204, which may cause a temporarily stalling of a compute pipeline of the processor core 204. In response to invoking pipeline stalling to temporarily stall the compute pipeline at block 1212, the processor core 204 proceeds to block 1210.

At block 1210, the processor core 204 generates an alert including mitigation measure(s) invoked and an instruction to re-train a machine-learning model. For example, the droop monitor circuitry 206, and/or, more generally, the processor core 204, may transmit an alert, an indication, a message, etc., to the guard band controller 202 to re-train the ML model(s) 228 (FIG. 2) in response to the voltage droop satisfying one or more threshold. In some examples, the droop monitor circuitry 206, and/or, more generally, the processor core 204, may generate the alert to include one or more mitigation measures that are invoked, such as instruction throttling, clock gating, pipeline stalling (e.g., a stalling of an execution pipeline of a resource or portion thereof for one or more clock cycles), etc., and/or a combination thereof, which may be used to facilitate the re-training of the ML model(s) 228 based on the alert. In response to generating the alert at block 1214, control may return to block 822 of the machine readable instructions 800 of FIG. 8 to determine whether to continue monitoring the first computing system. Additionally or alternatively, the process 820 of FIG. 12 may conclude in response to generating the alert at block 1214.

Figure 13:
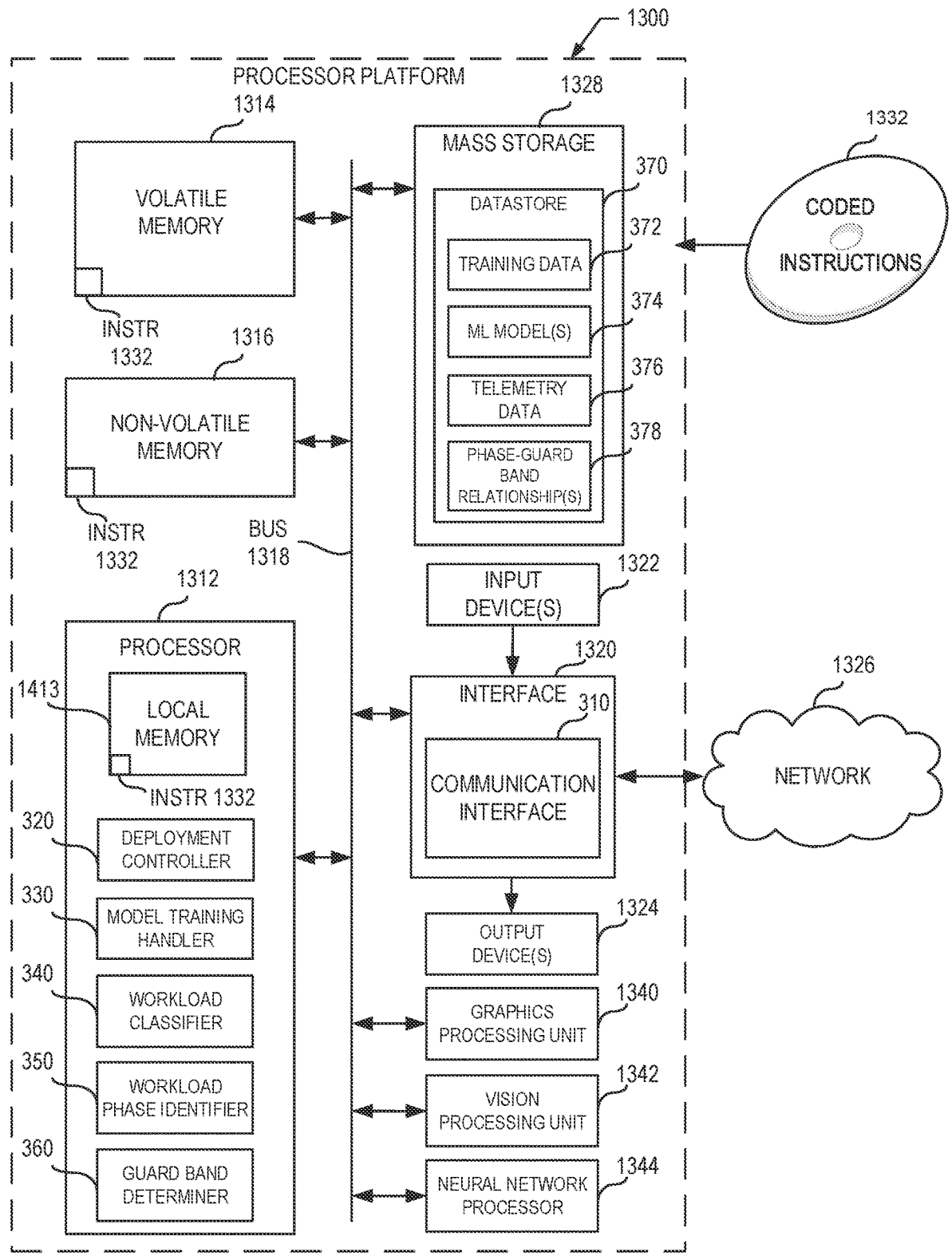
FIG. 13 is a block diagram of an example processing platform structured to execute the example machine readable instructions of FIGS. 8-12 to implement the example droop monitor circuitry of FIG. 2, the example guard band controller of FIGS. 1, 2, and/or 3, and/or, more generally, the example computing system of FIG. 1.

FIG. 13 is a block diagram of an example processor platform 1300 structured to execute the instructions of FIGS. 8-12 to implement the example guard band controller 104A-F of FIG. 1, the example guard band controller 202 of FIG. 2, and/or the example guard band controller 300 of FIG. 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the example deployment controller 320, the example model training handler 330, the example workload classifier 340, the example workload phase identifier 350, and the example guard band determiner 360 of FIG. 3.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by SDRAM, DRAM, RDRAM®, and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface. In this example, the interface circuit 1320 implements the communication interface 310 of FIG. 3.

In the illustrated example, one or more input devices 1322 are connected to the interface circuit 1320. The input device(s) 1322 permit(s) a user to enter data and/or commands into the processor 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives. In this example, the one or more mass storage devices 1328 implement the example datastore 370 of FIG. 3, which includes the example training data 372, the example ML model(s) 374, the example telemetry data 376, and the example phase-guard band relationship(s) 378 of FIG. 3.

The machine executable instructions 1332 of FIGS. 8-12 may be stored in the mass storage device 1328, in the volatile memory 1314, in the non-volatile memory 1316, and/or on a removable non-transitory computer readable storage medium such as a CD or DVD.

The processor platform 1300 of the illustrated example of FIG. 13 includes an example graphics processing unit (GPU) 1340, an example vision processing unit (VPU) 1342, and an example neural network processor 1344. In this example, the GPU 1340, the VPU 1342, and the neural network processor 1344 are in communication with different hardware of the processor platform 1300, such as the volatile memory 1314, the non-volatile memory 1316, etc., via the bus 1318. In this example, the neural network processor 1344 may be implemented by one or more integrated circuits, logic circuits, microprocessors, GPUs, DSPs, or controllers from any desired family or manufacturer that can be used to execute an AI model, such as a neural network, which may be implemented by the ML model(s) 374. In some examples, one or more of the deployment controller 320, the model training handler 330, the workload classifier 340, the workload phase identifier 350, and/or guard band determiner 360 can be implemented in or with at least one of the GPU 1340, the VPU 1342, or the neural network processor 1344 instead of or in addition to the processor 1312.

In some examples, the graphics processing unit 1340 may implement the first acceleration resource 108, the second acceleration resource 110, and/or the general purpose processing resource 112 of FIG. 1. In some examples, the VPU 1342 may implement the first acceleration resource 108, the second acceleration resource 110, and/or the general purpose processing resource 112 of FIG. 1. In some examples, the neural network processor 1344 may implement the first acceleration resource 108, the second acceleration resource 110, and/or the general purpose processing resource 112 of FIG. 1.

Figure 14:
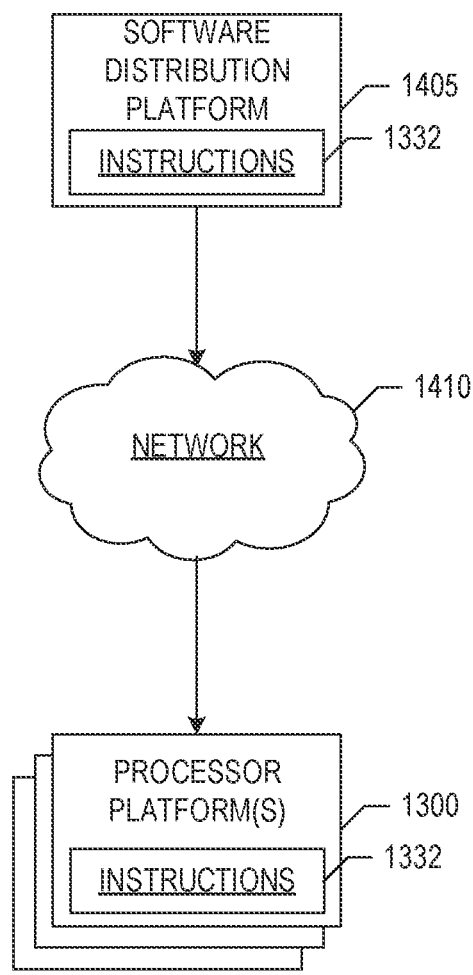
FIG. 14 is a block diagram of an example software distribution platform to distribute example software to example client devices.

A block diagram illustrating an example software distribution platform 1405 to distribute software such as the example computer readable instructions 1332 of FIG. 13 to third parties is illustrated in FIG. 14. For example, the software distribution platform 1405 may distribute software (e.g., software corresponding to the example machine readable instructions of FIGS. 8-12) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

In some examples, the software distribution platform 1405 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1332 of FIG. 13. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the computer readable instructions 1332, which may correspond to the example computer readable instructions 800, 802, 820, 904, 906 of FIGS. 8-12, as described above. The one or more servers of the example software distribution platform 1405 are in communication with a network 1410, which may correspond to any one or more of the Internet and/or any of the example networks 128, 1326 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1332 from the software distribution platform 1405. For example, the software, which may correspond to the example computer readable instructions 800, 802, 820, 904, 906 of FIGS. 8-12, may be downloaded to the example processor platform 1300, which is to execute the computer readable instructions 1332 to implement the example guard band controller 104A-F of FIG. 1, the example guard band controller 202 of FIG. 2, and/or the example guard band controller 300 of FIG. 3. In some examples, one or more servers of the software distribution platform 1405 periodically offer, transmit, and/or force updates to the software (e.g., the example computer readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that optimize and/or otherwise improve guard bands for hardware resources of a computing system. The disclosed systems, methods, apparatus, and articles of manufacture improve the efficiency of using a computing device by reducing a guard band of a resource, which may correspond to wasted power consumption, and reallocating power that corresponds to the guard band reduction to the resource or other resource(s) to improve performance of the computing system. The disclosed systems, methods, apparatus, and articles of manufacture may (i) increase performance of the resource or the other resource(s) to maintain the same level of power consumption in response to decreasing the guard band or (ii) may maintain the same level of performance with reduced power consumption in response to decreasing the guard band. The disclosed systems, methods, apparatus, and articles of manufacture are accordingly directed to one or more improvement(s) in the functioning of a computer.

Example methods, apparatus, systems, and articles of manufacture to optimize and/or otherwise improve a guard band of a hardware resource are disclosed herein. Further examples and combinations thereof include the following:

Example 1 includes an apparatus comprising at least one storage device, and at least one processor to execute instructions to identify a phase of a workload based on an output from a machine-learning model, the phase based on a utilization of one or more hardware resources, and based on the phase, control a guard band of a first hardware resource of the one or more hardware resources.

Example 2 includes the apparatus of example 1, further including power management circuitry to determine a voltage identification definition based on a value of the guard band, and a voltage regulator to deliver a voltage to the first hardware resource based on the voltage identification definition.

Example 3 includes the apparatus of any one of examples 1-2, wherein the first hardware resource is a processor core, the processor core including circuitry, the circuitry to measure a voltage droop associated with the processor core, the voltage droop based on an execution of the workload by the processor core, and execute a mitigation action associated with the processor core in response to the voltage droop satisfying a threshold.

Example 4 includes the apparatus of any one of examples 1-3, wherein the mitigation action is at least one of a reduction in an operating frequency of the processor core, a stalling of an execution pipeline of the processor core for one or more clock cycles, or a termination of a first instruction of the instructions to be executed by the processor core.

Example 5 includes the apparatus of any one of examples 1-4, wherein the output is a first output, and the at least one processor is to determine one or more telemetry parameters based on telemetry data, the telemetry data obtained from the first hardware resource, the one or more telemetry parameters including the utilization, and classify the workload based on the one or more telemetry parameters, the classification of the workload based on a second output of the machine-learning model.

Example 6 includes the apparatus of any one of examples 1-5, wherein the workload is a first workload type, the phase is a first phase, and the at least one processor is to obtain resource utilization data corresponding to a plurality of workload types, the plurality of the workload types including the first workload type, determine a plurality of resource utilization phases corresponding to the first workload type, the plurality of the resource utilization phases including the first phase and a second phase, generate a label corresponding to the first workload type, generate a classification corresponding to the first workload type, determine a probability corresponding to an association of the first phase and the second phase, and determine the guard band based on the probability, the machine-learning model to be trained based on at least one of the plurality of the resource utilization phases, the label, the classification, the probability, or the guard band.

Example 7 includes the apparatus of any one of examples 1-6, wherein the at least one processor is to identify one or more resource utilization phases corresponding to a type of the workload, the one or more resource utilization phases including the phase, determine one or more patterns of the one or more resource utilization phases, the one or more patterns based on a residency of the first hardware resource at the one or more resource utilization phases, and generate a resource utilization threshold based on the one or more patterns, the phase to be identified in response to the utilization satisfying the resource utilization threshold.

Example 8 includes at least one non-transitory computer readable storage medium comprising instructions that, when executed, cause at least one processor to at least identify a phase of a workload based on an output from a machine-learning model, the phase based on a utilization of one or more hardware resources, and based on the phase, control a guard band of a first hardware resource of the one or more hardware resources.

Example 9 includes the at least one non-transitory computer readable storage medium of example 8, wherein the instructions, when executed, cause the at least one processor to determine a voltage identification definition based on a value of the guard band, and cause a voltage to be delivered to the first hardware resource based on the voltage identification definition.

Example 10 includes the at least one non-transitory computer readable storage medium of any one of examples 8-9, wherein the first hardware resource is a processor core, and the instructions, when executed, cause the at least one processor to measure a voltage droop associated with the processor core, the voltage droop based on an execution of the workload by the processor core, and execute a mitigation action associated with the processor core in response to the voltage droop satisfying a threshold.

Example 11 includes the at least one non-transitory computer readable storage medium of any one of examples 8-10, wherein the mitigation action is at least one of a reduction in an operating frequency of the processor core, a stalling of an execution pipeline of the processor core for one or more clock cycles, or a termination of a first instruction of the instructions to be executed by the processor core.

Example 12 includes the at least one non-transitory computer readable storage medium of any one of examples 8-11, wherein the output is a first output, and the instructions, when executed, cause the at least one processor to determine one or more telemetry parameters based on telemetry data, the telemetry data obtained from the first hardware resource, the one or more telemetry parameters including the utilization, and classify the workload based on the one or more telemetry parameters, the classification of the workload based on a second output of the machine-learning model.

Example 13 includes the at least one non-transitory computer readable storage medium of any one of examples 8-12, wherein the workload is a first workload type, the phase is a first phase, and the instructions, when executed, cause the at least one processor to obtain resource utilization data corresponding to a plurality of workload types, the plurality of the workload types including the first workload type, determine a plurality of resource utilization phases corresponding to the first workload type, the plurality of the resource utilization phases including the first phase and a second phase, generate a label corresponding to the first workload type, generate a classification corresponding to the first workload type, determine a probability corresponding to an association of the first phase and the second phase, and determine the guard band based on the probability, the machine-learning model to be trained based on at least one of the plurality of the resource utilization phases, the label, the classification, the probability, or the guard band.

Example 14 includes the at least one non-transitory computer readable storage medium of any one of examples 8-13, wherein the instructions, when executed, cause the at least one processor to identify one or more resource utilization phases corresponding to a type of the workload, the one or more resource utilization phases including the phase, determine one or more patterns of the one or more resource utilization phases, the one or more patterns based on a residency of the first hardware resource at the one or more resource utilization phases, and generate a resource utilization threshold based on the one or more patterns, the phase to be identified in response to the utilization satisfying the resource utilization threshold.

Example 15 includes an apparatus comprising means for identifying a phase of a workload based on an output from a machine-learning model, the phase based on a utilization of one or more hardware resources, and based on the phase, means for controlling a guard band of a first hardware resource of the one or more hardware resources.

Example 16 includes the apparatus of example 15, further including means for determining a voltage identification definition based on a value of the guard band, and means for delivering a voltage to the first hardware resource based on the voltage identification definition.

Example 17 includes the apparatus of any one of examples 15-16, further including means for measuring a voltage droop associated with the first hardware resource, the voltage droop based on an execution of the workload by the first hardware resource, and execute a mitigation action associated with the first hardware resource in response to the voltage droop satisfying a threshold.

Example 18 includes the apparatus of any one of examples 15-17, wherein the mitigation action is at least one of a reduction in an operating frequency of the first hardware resource, a stalling of an execution pipeline of the first hardware resource for one or more clock cycles, or a termination of an instruction to be executed by the first hardware resource.

Example 19 includes the apparatus of any one of examples 15-18, wherein the output is a first output, and further including means for determining one or more telemetry parameters based on telemetry data, the telemetry data obtained from the first hardware resource, the one or more telemetry parameters including the utilization, and classify the workload based on the one or more telemetry parameters, the classification of the workload based on a second output of the machine-learning model.

Example 20 includes the apparatus of any one of examples 15-19, wherein the workload is a first workload type, the phase is a first phase, and further including means for obtaining resource utilization data corresponding to a plurality of workload types, the plurality of the workload types including the first workload type, means for assigning, the means for assigning to assign a label corresponding to the first workload type, and assign a classification corresponding to the first workload type, the means for identifying to determine a plurality of resource utilization phases corresponding to the first workload type, the plurality of the resource utilization phases including the first phase and a second phase, and identify a probability corresponding to an association of the first phase and the second phase, and the means for controlling to determine the guard band based on the probability, the machine-learning model to be trained based on at least one of the plurality of the resource utilization phases, the label, the classification, the probability, or the guard band.

Example 21 includes the apparatus of any one of examples 15-20, wherein the means for identifying is to identify one or more resource utilization phases corresponding to a type of the workload, the one or more resource utilization phases including the phase, determine one or more patterns of the one or more resource utilization phases, the one or more patterns based on a residency of the first hardware resource at the one or more resource utilization phases, and generate a resource utilization threshold based on the one or more patterns, the phase to be identified in response to the utilization satisfying the resource utilization threshold.

Example 22 includes an apparatus comprising a workload phase identifier to identify a phase of a workload based on an output from a machine-learning model, the phase based on a utilization of one or more hardware resources, and based on the phase, a guard band determiner to control a guard band of a first hardware resource of the one or more hardware resources.

Example 23 includes the apparatus of example 22, further including power management circuitry to determine a voltage identification definition based on a value of the guard band, and voltage regulator circuitry to deliver a voltage to the first hardware resource based on the voltage identification definition.

Example 24 includes the apparatus of any one of examples 22-23, wherein the first hardware resource is a processor core, the processor core including circuitry, the circuitry to measure a voltage droop associated with the processor core, the voltage droop based on an execution of the workload by the processor core, and execute a mitigation action associated with the processor core in response to the voltage droop satisfying a threshold.

Example 25 includes the apparatus of any one of examples 22-24, wherein the mitigation action is at least one of a reduction in an operating frequency of the processor core, a stalling of an execution pipeline of the processor core for one or more clock cycles, or a termination of an instruction to be executed by the processor core.

Example 26 includes the apparatus of any one of examples 22-25, wherein the output is a first output, and further including a communication interface to determine one or more telemetry parameters based on telemetry data, the telemetry data obtained from the first hardware resource, the one or more telemetry parameters including the utilization, and a workload classifier to classify the workload based on the one or more telemetry parameters, the classification of the workload based on a second output of the machine-learning model.

Example 27 includes the apparatus of any one of examples 22-26, wherein the workload is a first workload type, the phase is a first phase, and further including a communication interface to obtain resource utilization data corresponding to a plurality of workload types, the plurality of the workload types including the first workload type, a workload classifier to generate a label corresponding to the first workload type, and generate a classification corresponding to the first workload type, the workload phase identifier to determine a plurality of resource utilization phases corresponding to the first workload type, the plurality of the resource utilization phases including the first phase and a second phase, and determine a probability corresponding to an association of the first phase and the second phase, and the guard band determiner to determine the guard band based on the probability, the machine-learning model to be trained based on at least one of the plurality of the resource utilization phases, the label, the classification, the probability, or the guard band.

Example 28 includes the apparatus of any one of examples 22-27, wherein the workload phase identifier is to identify one or more resource utilization phases corresponding to a type of the workload, the one or more resource utilization phases including the phase, determine one or more patterns of the one or more resource utilization phases, the one or more patterns based on a residency of the first hardware resource at the one or more resource utilization phases, and generate a resource utilization threshold based on the one or more patterns, the phase to be identified in response to the utilization satisfying the resource utilization threshold.

Example 29 includes a method to improve power consumption of a computing device, comprising identifying a phase of a workload based on an output from a machine-learning model, the phase based on a utilization of one or more hardware resources, and based on the phase, controlling a guard band of a first hardware resource of the one or more hardware resources.

Example 30 includes the method of example 29, further including determining a voltage identification definition based on a value of the guard band, and delivering a voltage to the first hardware resource based on the voltage identification definition.

Example 31 includes the method of any one of examples 29-30, wherein the first hardware resource is a processor core, and further including measuring a voltage droop associated with the processor core, the voltage droop based on an execution of the workload by the processor core, and executing a mitigation action associated with the processor core in response to the voltage droop satisfying a threshold.

Example 32 includes the method of any one of examples 29-31, wherein the mitigation action is at least one of a reduction in an operating frequency of the processor core, a stalling of an execution pipeline of the processor core for one or more clock cycles, or a termination of an instruction to be executed by the processor core.

Example 33 includes the method of any one of examples 29-32, wherein the output is a first output, and further including determining one or more telemetry parameters based on telemetry data, the telemetry data obtained from the first hardware resource, the one or more telemetry parameters including the utilization, and classifying the workload based on the one or more telemetry parameters, the classification of the workload based on a second output of the machine-learning model.

Example 34 includes the method of any one of examples 29-33, wherein the workload is a first workload type, the phase is a first phase, and further including obtaining resource utilization data corresponding to a plurality of workload types, the plurality of the workload types including the first workload type, determining a plurality of resource utilization phases corresponding to the first workload type, the plurality of the resource utilization phases including the first phase and a second phase, generating a label corresponding to the first workload type, generating a classification corresponding to the first workload type, determining a probability corresponding to an association of the first phase and the second phase, and determining the guard band based on the probability, the machine-learning model to be trained based on at least one of the plurality of the resource utilization phases, the label, the classification, the probability, or the guard band.

Example 35 includes the method of any one of examples 29-34, further including identifying one or more resource utilization phases corresponding to a type of the workload, the one or more resource utilization phases including the phase, determining one or more patterns of the one or more resource utilization phases, the one or more patterns based on a residency of the first hardware resource at the one or more resource utilization phases, and generating a resource utilization threshold based on the one or more patterns, the phase to be identified in response to the utilization satisfying the resource utilization threshold.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:
1. An apparatus comprising:
at least one storage device; and
at least one processor to execute instructions to:
identify a first phase of a workload based on a first output from a machine-learning model, the first phase based on a utilization of one or more hardware resources;
determine one or more telemetry parameters based on telemetry data, the telemetry data obtained from a first hardware resource of the one or more hardware resources, the one or more telemetry parameters including the utilization;

classify the workload based on the one or more telemetry parameters, the classification of the workload based on a second output of a machine-learning model;

determine a guard band of the first hardware resource based on the first output of the machine-learning model, the classification, and a probability that the one or more hardware resources transition from the first phase to a second phase; and based on the first phase, control the guard band.

2. The apparatus of claim 1, further including:

power management circuitry to determine a voltage identification definition based on a value of the guard band; and a voltage regulator to deliver a voltage to the first hardware resource based on the voltage identification definition.

3. The apparatus of claim 1, wherein the first hardware resource is a processor core, the processor core including circuitry, the circuitry to:

measure a voltage droop associated with the processor core, the voltage droop based on an execution of the workload by the processor core; and execute a mitigation action associated with the processor core in response to the voltage droop satisfying a threshold.

4. The apparatus of claim 3, wherein the mitigation action is at least one of a reduction in an operating frequency of the processor core, a stalling of an execution pipeline of the processor core for one or more clock cycles, or a termination of a first instruction of the instructions to be executed by the processor core.

5. The apparatus of claim 1, wherein the workload is a first workload type, the probability is a first probability, the guard band is a first guard band value, and the at least one processor is to:

obtain resource utilization data corresponding to a plurality of workload types, the plurality of the workload types including the first workload type;

determine a plurality of resource utilization phases corresponding to the first workload type, the plurality of the resource utilization phases including the first phase and the second phase;

generate a label corresponding to the first workload type;

generate a classification corresponding to the first workload type; and determine a plurality of probabilities of a workload transitioning between two of the plurality of resource utilization phases, the plurality of probabilities including the first probability; and determine a plurality of guard band values based on the plurality of probabilities, the plurality of guard band values including the first guard band value, the machine-learning model to be trained based on at least one of the plurality of the resource utilization phases, the label, the classification, the plurality of probabilities, or the plurality of guard band values.

6. The apparatus of claim 1, wherein the at least one processor is to:

identify one or more resource utilization phases corresponding to a type of the workload, the one or more resource utilization phases including the first phase and the second phase;

determine one or more patterns of the one or more resource utilization phases, the one or more patterns based on a residency of the first hardware resource at the one or more resource utilization phases; and generate a resource utilization threshold based on the one or more patterns, the first phase to be identified in response to the utilization satisfying the resource utilization threshold.

7. At least one non-transitory computer readable storage medium comprising instructions that, when executed, cause at least one processor to at least:

identify a first phase of a workload based on a first output from a machine-learning model, the first phase based on a utilization of one or more hardware resources;

determine one or more telemetry parameters based on telemetry data, the telemetry data obtained from a first hardware resource of the one or more hardware resources, the one or more telemetry parameters including the utilization;

classify the workload based on the one or more telemetry parameters, the classification of the workload based on a second output of a machine-learning model;

determine a guard band of the first hardware resource based on the first output of the machine-learning model, the classification, and a probability that the one or more hardware resources transition from the first phase to a second phase; and based on the first phase, control the guard band.

8. The at least one non-transitory computer readable storage medium of claim 7, wherein the instructions, when executed, cause the at least one processor to:

determine a voltage identification definition based on a value of the guard band; and cause a voltage to be delivered to the first hardware resource based on the voltage identification definition.

9. The at least one non-transitory computer readable storage medium of claim 7, wherein the first hardware resource is a processor core, and the instructions, when executed, cause the at least one processor to:

measure a voltage droop associated with the processor core, the voltage droop based on an execution of the workload by the processor core; and execute a mitigation action associated with the processor core in response to the voltage droop satisfying a threshold.

10. The at least one non-transitory computer readable storage medium of claim 9, wherein the mitigation action is at least one of a reduction in an operating frequency of the processor core, a stalling of an execution pipeline of the processor core for one or more clock cycles, or a termination of a first instruction of the instructions to be executed by the processor core.

11. The at least one non-transitory computer readable storage medium of claim 7, wherein the workload is a first workload type, the probability is a first probability, the guard band is a first guard band value, and the instructions, when executed, cause the at least one processor to:

obtain resource utilization data corresponding to a plurality of workload types, the plurality of the workload types including the first workload type;

determine a plurality of resource utilization phases corresponding to the first workload type, the plurality of the resource utilization phases including the first phase and the second phase;

generate a label corresponding to the first workload type;

generate a classification corresponding to the first workload type;

determine a plurality of probabilities of a workload transitioning between two of the plurality of resource utilization phases, the plurality of probabilities including the first probability; and determine a plurality of guard band values based on the plurality of probabilities, the plurality of guard band values including the first guard band value, the machine-learning model to be trained based on at least one of the plurality of the resource utilization phases, the label, the classification, the plurality of probabilities, or the plurality of guard band values.

12. The at least one non-transitory computer readable storage medium of claim 7, wherein the instructions, when executed, cause the at least one processor to:

identify one or more resource utilization phases corresponding to a type of the workload, the one or more resource utilization phases including the first phase and the second phase;

determine one or more patterns of the one or more resource utilization phases, the one or more patterns based on a residency of the first hardware resource at the one or more resource utilization phases; and generate a resource utilization threshold based on the one or more patterns, the first phase to be identified in response to the utilization satisfying the resource utilization threshold.

13. An apparatus comprising:

workload phase identifier circuitry to identify a first phase of a workload based on a first output from a machine-learning model, the first phase based on a utilization of one or more hardware resources;

communication interface circuitry to determine one or more telemetry parameters based on telemetry data, the telemetry data obtained from a first hardware resource of the one or more hardware resources, the one or more telemetry parameters including the utilization;

workload classifier circuitry to classify the workload based on the one or more telemetry parameters, the classification of the workload based on a second output of the machine-learning model; and guard band control circuitry to:

determine a guard band of the first hardware resource based on the first output of the machine-learning model, the classification, and a probability that the one or more hardware resources transition from the first phase to a second phase; and based on the first phase, control the guard band.

14. The apparatus of claim 13, further including:

power management circuitry to determine a voltage identification definition based on a value of the guard band; and voltage regulator circuitry to deliver a voltage to the first hardware resource based on the voltage identification definition.

15. The apparatus of claim 13, wherein the first hardware resource is a processor core, the processor core including circuitry, the circuitry to:

measure a voltage droop associated with the processor core, the voltage droop based on an execution of the workload by the processor core; and execute a mitigation action associated with the processor core in response to the voltage droop satisfying a threshold.

16. The apparatus of claim 15, wherein the mitigation action is at least one of a reduction in an operating frequency of the processor core, a stalling of an execution pipeline of the processor core for one or more clock cycles, or a termination of an instruction to be executed by the processor core.

17. The apparatus of claim 13, wherein the workload is a first workload type, the probability is a first probability, the guard band is a first guard band value and:

the communication interface circuitry is to obtain resource utilization data corresponding to a plurality of workload types, the plurality of the workload types including the first workload type;

the workload classifier circuitry is to:

generate a label corresponding to the first workload type; and generate a classification corresponding to the first workload type;

the workload phase identifier circuitry to:

determine a plurality of resource utilization phases corresponding to the first workload type, the plurality of the resource utilization phases including the first phase and a second phase; and determine a plurality of probabilities of a workload transitioning between two of the plurality of resource utilization phases, the plurality of probabilities including the first probability; and the guard band control circuitry is to determine a plurality of guard band values based on the plurality of probabilities, the plurality of guard band values including the first guard band value, the machine-learning model to be trained based on at least one of the plurality of the resource utilization phases, the label, the classification, the plurality of probabilities, or the plurality of guard band values.

18. The apparatus of claim 13, wherein the workload phase identifier circuitry is to:

identify one or more resource utilization phases corresponding to a type of the workload, the one or more resource utilization phases including the first phase and the second phase;

determine one or more patterns of the one or more resource utilization phases, the one or more patterns based on a residency of the first hardware resource at the one or more resource utilization phases; and generate a resource utilization threshold based on the one or more patterns, the first phase to be identified in response to the utilization satisfying the resource utilization threshold.

19. A method to improve power consumption of a computing device, the method comprising:

identifying a first phase of a workload based on a first output from a machine-learning model, the first phase based on a utilization of one or more hardware resources;

determining one or more telemetry parameters based on telemetry data, the telemetry data obtained from a first hardware resource of the one or more hardware resources, the one or more telemetry parameters including the utilization;

classifying the workload based on the one or more telemetry parameters, the classification of the workload based on a second output of a machine-learning model;

determining a guard band of the first hardware resource based on the first output of the machine-learning model, the classification, and a probability that the one or more hardware resources transition from the first phase to a second phase; and based on the first phase, controlling the guard band.

20. The method of claim 19, further including:
   determining a voltage identification definition based on a value of the guard band; and
   delivering a voltage to the first hardware resource based on the voltage identification definition.

21. The method of claim 19, wherein the first hardware resource is a processor core, and further including:
   measuring a voltage droop associated with the processor core, the voltage droop based on an execution of the workload by the processor core; and
   executing a mitigation action associated with the processor core in response to the voltage droop satisfying a threshold.

22. The method of claim 21, wherein the mitigation action is at least one of a reduction in an operating frequency of the processor core, a stalling of an execution pipeline of the processor core for one or more clock cycles, or a termination of an instruction to be executed by the processor core.

* * * * *